United States Patent
Azizi et al.

(10) Patent No.: US 9,886,899 B2
(45) Date of Patent: Feb. 6, 2018

(54) PIXEL CIRCUITS FOR AMOLED DISPLAYS

(71) Applicant: Ignis Innovation Inc., Waterloo (CA)

(72) Inventors: Yaser Azizi, Waterloo (CA);
Gholamreza Chaji, Waterloo (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

(21) Appl. No.: 14/491,763

(22) Filed: Sep. 19, 2014

(65) Prior Publication Data
US 2015/0054811 A1    Feb. 26, 2015

Related U.S. Application Data

(63) Continuation-in-part of application No. 14/459,979, filed on Aug. 14, 2014, now Pat. No. 9,606,607,
(Continued)

(51) Int. Cl.
*G09G 3/32*     (2016.01)
*G09G 3/3233*   (2016.01)
*G06F 1/32*     (2006.01)

(52) U.S. Cl.
CPC ......... *G09G 3/3233* (2013.01); *G06F 1/3218* (2013.01); *G06F 1/3265* (2013.01);
(Continued)

(58) Field of Classification Search
None
See application file for complete search history.

(56) References Cited

U.S. PATENT DOCUMENTS 3,506,851 A    4/1970  Polkinghorn et al.
3,750,987 A    8/1973  Gobel
(Continued)

FOREIGN PATENT DOCUMENTS

AU    729652     6/1997
AU    764896     12/2001
(Continued)

OTHER PUBLICATIONS

Ahnood et al.: "Effect of threshold voltage instability on field effect mobility in thin film transistors deduced from constant current measurements"; dated Aug. 2009.
(Continued)

*Primary Examiner* — Antonio Xavier
(74) *Attorney, Agent, or Firm* — Nixon Peabody LLP

(57) ABSTRACT

A system for driving a display that includes a plurality of pixel circuits arranged in an array, each of the pixel circuits including a light emitting device and a driving transistor for conveying a driving current through the light emitting device. Each of a first plurality of supply lines is associated with at least one pixel circuit in a preselected segment of the array, the first plurality of supply lines providing driving currents to the at least one pixel circuit in the preselected segment. Each of a plurality of voltage supplies is configured to provide a supply voltage to the at least one pixel circuit in the preselected segment of the array, the voltage supplies being controllably coupled to the pixel circuits in the preselected segment of the array. A controller determines which of the plurality of voltage supplies to connect to the preselected segment of the array.

2 Claims, 10 Drawing Sheets

Related U.S. Application Data which is a continuation-in-part of application No. 13/474,131, filed on May 17, 2012, now Pat. No. 9,134,825, application No. 14/491,763, which is a continuation-in-part of application No. 14/474,977, filed on Sep. 2, 2014, now abandoned, which is a continuation-in-part of application No. 13/789,978, filed on Mar. 8, 2013, now Pat. No. 9,351,368.

(60) Provisional application No. 61/487,272, filed on May 17, 2011.

(52) U.S. Cl.
CPC ........... *G09G 2300/0866* (2013.01); *G09G 2320/043* (2013.01); *G09G 2320/045* (2013.01); *G09G 2320/048* (2013.01); *G09G 2320/0613* (2013.01); *G09G 2320/0626* (2013.01); *G09G 2330/021* (2013.01); *G09G 2330/022* (2013.01); *Y02B 60/1242* (2013.01)

(56) References Cited

U.S. PATENT DOCUMENTS

| | | | |
|---|---|---|---|
| 3,774,055 | A | 11/1973 | Bapat et al. |
| 4,090,096 | A | 5/1978 | Nagami |
| 4,354,162 | A | 10/1982 | Wright |
| 4,402,075 | A * | 8/1983 | Bargeton ............ H04B 17/408 370/246 |
| 4,996,523 | A | 2/1991 | Bell et al. |
| 5,134,387 | A | 7/1992 | Smith et al. |
| 5,153,420 | A | 10/1992 | Hack et al. |
| 5,170,158 | A | 12/1992 | Shinya |
| 5,204,661 | A | 4/1993 | Hack et al. |
| 5,266,515 | A | 11/1993 | Robb et al. |
| 5,278,542 | A | 1/1994 | Smith et al. |
| 5,408,267 | A | 4/1995 | Main |
| 5,498,880 | A | 3/1996 | Lee et al. |
| 5,572,444 | A | 11/1996 | Lentz et al. |
| 5,589,847 | A | 12/1996 | Lewis |
| 5,619,033 | A | 4/1997 | Weisfield |
| 5,648,276 | A | 7/1997 | Hara et al. |
| 5,670,973 | A | 9/1997 | Bassetti et al. |
| 5,691,783 | A | 11/1997 | Numao et al. |
| 5,701,505 | A | 12/1997 | Yamashita et al. |
| 5,714,968 | A | 2/1998 | Ikeda |
| 5,744,824 | A | 4/1998 | Kousai et al. |
| 5,745,660 | A | 4/1998 | Kolpatzik et al. |
| 5,748,160 | A | 5/1998 | Shieh et al. |
| 5,758,129 | A | 5/1998 | Gray et al. |
| 5,835,376 | A | 11/1998 | Smith et al. |
| 5,870,071 | A | 2/1999 | Kawahata |
| 5,874,803 | A | 2/1999 | Garbuzov et al. |
| 5,880,582 | A | 3/1999 | Sawada |
| 5,881,299 | A * | 3/1999 | Nomura ............... G06F 1/3218 345/103 |
| 5,903,248 | A | 5/1999 | Irwin |
| 5,917,280 | A | 6/1999 | Burrows et al. |
| 5,949,398 | A | 9/1999 | Kim |
| 5,952,789 | A | 9/1999 | Stewart et al. |
| 5,990,629 | A * | 11/1999 | Yamada ............... G09G 3/2011 257/71 |
| 6,023,259 | A | 2/2000 | Howard et al. |
| 6,069,365 | A | 5/2000 | Chow et al. |
| 6,091,203 | A | 7/2000 | Kawashima et al. |
| 6,097,360 | A | 8/2000 | Holloman |
| 6,100,868 | A | 8/2000 | Lee et al. |
| 6,144,222 | A | 11/2000 | Ho |
| 6,229,506 | B1 | 5/2001 | Dawson et al. |
| 6,229,508 | B1 | 5/2001 | Kane |
| 6,246,180 | B1 | 6/2001 | Nishigaki |
| 6,252,248 | B1 | 6/2001 | Sano et al. |
| 6,268,841 | B1 | 7/2001 | Cairns et al. |
| 6,288,696 | B1 | 9/2001 | Holloman |
| 6,307,322 | B1 | 10/2001 | Dawson et al. |
| 6,310,962 | B1 | 10/2001 | Chung et al. |
| 6,323,631 | B1 | 11/2001 | Juang |
| 6,333,729 | B1 | 12/2001 | Ha |
| 6,388,653 | B1 | 5/2002 | Goto et al. |
| 6,392,617 | B1 | 5/2002 | Gleason |
| 6,396,469 | B1 | 5/2002 | Miwa et al. |
| 6,414,661 | B1 | 7/2002 | Shen |
| 6,417,825 | B1 | 7/2002 | Stewart et al. |
| 6,430,496 | B1 | 8/2002 | Smith et al. |
| 6,433,488 | B1 | 8/2002 | Bu |
| 6,473,065 | B1 | 10/2002 | Fan |
| 6,475,845 | B2 | 11/2002 | Kimura |
| 6,501,098 | B2 | 12/2002 | Yamazaki |
| 6,501,466 | B1 | 12/2002 | Yamagashi et al. |
| 6,522,315 | B2 | 2/2003 | Ozawa et al. |
| 6,535,185 | B2 | 3/2003 | Kim et al. |
| 6,542,138 | B1 | 4/2003 | Shannon et al. |
| 6,559,839 | B1 | 5/2003 | Ueno et al. |
| 6,580,408 | B1 | 6/2003 | Bae et al. |
| 6,583,398 | B2 | 6/2003 | Harkin |
| 6,618,030 | B2 | 9/2003 | Kane et al. |
| 6,639,244 | B1 | 10/2003 | Yamazaki et al. |
| 6,680,580 | B1 | 1/2004 | Sung |
| 6,686,699 | B2 | 2/2004 | Yumoto |
| 6,690,000 | B1 | 2/2004 | Muramatsu et al. |
| 6,693,610 | B2 | 2/2004 | Shannon et al. |
| 6,694,248 | B2 | 2/2004 | Smith et al. |
| 6,697,057 | B2 | 2/2004 | Koyama et al. |
| 6,724,151 | B2 | 4/2004 | Yoo |
| 6,734,636 | B2 * | 5/2004 | Sanford ................ G09G 3/325 315/169.1 |
| 6,753,655 | B2 | 6/2004 | Shih et al. |
| 6,753,834 | B2 | 6/2004 | Mikami et al. |
| 6,756,741 | B2 | 6/2004 | Li |
| 6,777,888 | B2 | 8/2004 | Kondo |
| 6,781,567 | B2 | 8/2004 | Kimura |
| 6,788,231 | B1 | 9/2004 | Hsueh |
| 6,809,706 | B2 | 10/2004 | Shimoda |
| 6,828,950 | B2 | 12/2004 | Koyama |
| 6,858,991 | B2 | 2/2005 | Miyazawa |
| 6,859,193 | B1 | 2/2005 | Yumoto |
| 6,864,637 | B2 * | 3/2005 | Park ..................... G09G 3/3233 257/350 |
| 6,876,346 | B2 | 4/2005 | Anzai et al. |
| 6,900,485 | B2 | 5/2005 | Lee |
| 6,903,734 | B2 | 6/2005 | Eu |
| 6,911,960 | B1 | 6/2005 | Yokoyama |
| 6,911,964 | B2 | 6/2005 | Lee et al. |
| 6,914,448 | B2 | 7/2005 | Jinno |
| 6,919,871 | B2 | 7/2005 | Kwon |
| 6,924,602 | B2 | 8/2005 | Komiya |
| 6,933,756 | B2 * | 8/2005 | Miyazawa ............ G09G 3/325 315/169.3 |
| 6,937,220 | B2 | 8/2005 | Kitaura et al. |
| 6,940,214 | B1 | 9/2005 | Komiya et al. |
| 6,954,194 | B2 | 10/2005 | Matsumoto et al. |
| 6,970,149 | B2 | 11/2005 | Chung et al. |
| 6,975,142 | B2 | 12/2005 | Azami et al. |
| 6,975,332 | B2 | 12/2005 | Arnold et al. |
| 6,995,519 | B2 | 2/2006 | Arnold et al. |
| 7,027,015 | B2 | 4/2006 | Booth, Jr. et al. |
| 7,034,793 | B2 | 4/2006 | Sekiya et al. |
| 7,038,392 | B2 | 5/2006 | Libsch et al. |
| 7,057,588 | B2 | 6/2006 | Asano et al. |
| 7,061,451 | B2 | 6/2006 | Kimura |
| 7,071,932 | B2 | 7/2006 | Libsch et al. |
| 7,106,285 | B2 | 9/2006 | Naugler |
| 7,112,820 | B2 | 9/2006 | Chang et al. |
| 7,113,864 | B2 | 9/2006 | Smith et al. |
| 7,122,835 | B1 | 10/2006 | Ikeda et al. |
| 7,129,914 | B2 | 10/2006 | Knapp et al. |
| 7,164,417 | B2 | 1/2007 | Cok |
| 7,224,332 | B2 | 5/2007 | Cok |
| 7,248,236 | B2 | 7/2007 | Nathan et al. |
| 7,259,737 | B2 | 8/2007 | Ono et al. |
| 7,262,753 | B2 | 8/2007 | Tanghe et al. |
| 7,274,363 | B2 | 9/2007 | Ishizuka et al. |
| 7,310,092 | B2 | 12/2007 | Forrest et al. |

(56) References Cited

U.S. PATENT DOCUMENTS

| | | |
|---|---|---|
| 7,315,295 B2 | 1/2008 | Kimura |
| 7,317,434 B2 | 1/2008 | Lan et al. |
| 7,321,348 B2 | 1/2008 | Cok et al. |
| 7,327,357 B2 | 2/2008 | Jeong |
| 7,333,077 B2 | 2/2008 | Koyama et al. |
| 7,343,243 B2 | 3/2008 | Smith et al. |
| 7,414,600 B2 | 8/2008 | Nathan et al. |
| 7,466,166 B2 | 12/2008 | Date et al. |
| 7,495,501 B2 | 2/2009 | Iwabuchi et al. |
| 7,502,000 B2 | 3/2009 | Yuki et al. |
| 7,515,124 B2 | 4/2009 | Yaguma et al. |
| 7,535,449 B2 | 5/2009 | Miyazawa |
| 7,554,512 B2 | 6/2009 | Steer |
| 7,569,849 B2 | 8/2009 | Nathan et al. |
| 7,595,776 B2 | 9/2009 | Hashimoto et al. |
| 7,604,718 B2 | 10/2009 | Zhang et al. |
| 7,609,239 B2 | 10/2009 | Chang |
| 7,612,745 B2 | 11/2009 | Yumoto et al. |
| 7,619,594 B2 | 11/2009 | Hu |
| 7,619,597 B2 | 11/2009 | Nathan et al. |
| 7,639,211 B2 | 12/2009 | Miyazawa |
| 7,683,899 B2 | 3/2010 | Hirakata et al. |
| 7,688,289 B2 | 3/2010 | Abe et al. |
| 7,760,162 B2 | 7/2010 | Miyazawa |
| 7,808,008 B2 | 10/2010 | Miyake |
| 7,859,520 B2 | 12/2010 | Kimura |
| 7,889,159 B2 | 2/2011 | Nathan et al. |
| 7,903,127 B2 | 3/2011 | Kwon |
| 7,920,116 B2 | 4/2011 | Woo et al. |
| 7,944,414 B2 | 5/2011 | Shirasaki et al. |
| 7,978,170 B2 | 7/2011 | Park et al. |
| 7,989,392 B2 | 8/2011 | Crockett et al. |
| 7,995,008 B2 | 8/2011 | Miwa |
| 8,063,852 B2 | 11/2011 | Kwak et al. |
| 8,102,343 B2 | 1/2012 | Yatabe |
| 8,144,081 B2 | 3/2012 | Miyazawa |
| 8,159,007 B2 | 4/2012 | Bama et al. |
| 8,242,979 B2 | 8/2012 | Anzai et al. |
| 8,253,665 B2 | 8/2012 | Nathan et al. |
| 8,319,712 B2 | 11/2012 | Nathan et al. |
| 8,405,582 B2 | 3/2013 | Kim |
| 8,456,581 B2 * | 6/2013 | Kimura ............. G02F 1/136213 349/38 |
| 8,665,214 B2 * | 3/2014 | Forutanpour ......... G09G 3/342 345/158 |
| 8,816,946 B2 | 8/2014 | Nathan et al. |
| 8,836,684 B2 * | 9/2014 | Harada ................ G09G 3/3655 345/211 |
| 8,878,816 B2 * | 11/2014 | Chen ................... G06F 3/0412 345/175 |
| 9,153,172 B2 * | 10/2015 | Nathan ................ G09G 3/3233 |
| 2001/0002703 A1 | 6/2001 | Koyama |
| 2001/0009283 A1 | 7/2001 | Arao et al. |
| 2001/0026257 A1 | 10/2001 | Kimura |
| 2001/0028226 A1 * | 10/2001 | Malaviya ............. G09G 3/3233 315/169.3 |
| 2001/0030323 A1 | 10/2001 | Ikeda |
| 2001/0040541 A1 | 11/2001 | Yoneda et al. |
| 2001/0043173 A1 | 11/2001 | Troutman |
| 2001/0045929 A1 | 11/2001 | Prache |
| 2001/0052940 A1 | 12/2001 | Hagihara et al. |
| 2002/0000576 A1 | 1/2002 | Inukai |
| 2002/0011796 A1 | 1/2002 | Koyama |
| 2002/0011799 A1 | 1/2002 | Kimura |
| 2002/0012057 A1 | 1/2002 | Kimura |
| 2002/0030190 A1 | 3/2002 | Ohtani et al. |
| 2002/0047565 A1 | 4/2002 | Nara et al. |
| 2002/0052086 A1 | 5/2002 | Maeda |
| 2002/0080108 A1 | 6/2002 | Wang |
| 2002/0084463 A1 | 7/2002 | Sanford et al. |
| 2002/0101172 A1 | 8/2002 | Bu |
| 2002/0117722 A1 | 8/2002 | Osada et al. |
| 2002/0140712 A1 | 10/2002 | Ouchi et al. |
| 2002/0158587 A1 | 10/2002 | Komiya |
| 2002/0158666 A1 | 10/2002 | Azami et al. |
| 2002/0158823 A1 | 10/2002 | Zavracky et al. |
| 2002/0171613 A1 | 11/2002 | Goto et al. |
| 2002/0186214 A1 | 12/2002 | Siwinski |
| 2002/0190971 A1 | 12/2002 | Nakamura et al. |
| 2002/0195967 A1 | 12/2002 | Kim et al. |
| 2002/0195968 A1 | 12/2002 | Sanford et al. |
| 2003/0001828 A1 | 1/2003 | Asano |
| 2003/0020413 A1 | 1/2003 | Oomura |
| 2003/0030603 A1 | 2/2003 | Shimoda |
| 2003/0062524 A1 | 4/2003 | Kimura |
| 2003/0062844 A1 | 4/2003 | Miyazawa |
| 2003/0076048 A1 | 4/2003 | Rutherford |
| 2003/0090445 A1 | 5/2003 | Chen et al. |
| 2003/0090447 A1 | 5/2003 | Kimura |
| 2003/0090481 A1 | 5/2003 | Kimura |
| 2003/0095087 A1 | 5/2003 | Libsch |
| 2003/0098829 A1 | 5/2003 | Chen et al. |
| 2003/0107560 A1 | 6/2003 | Yumoto et al. |
| 2003/0107561 A1 | 6/2003 | Uchino et al. |
| 2003/0111966 A1 | 6/2003 | Mikami et al. |
| 2003/0112205 A1 | 6/2003 | Yamada |
| 2003/0112208 A1 | 6/2003 | Okabe et al. |
| 2003/0117348 A1 | 6/2003 | Knapp et al. |
| 2003/0122474 A1 | 7/2003 | Lee |
| 2003/0122747 A1 | 7/2003 | Shannon et al. |
| 2003/0128199 A1 | 7/2003 | Kimura |
| 2003/0151569 A1 | 8/2003 | Lee et al. |
| 2003/0156104 A1 | 8/2003 | Morita |
| 2003/0169241 A1 | 9/2003 | LeChevalier |
| 2003/0169247 A1 | 9/2003 | Kawabe et al. |
| 2003/0179626 A1 | 9/2003 | Sanford et al. |
| 2003/0189535 A1 | 10/2003 | Matsumoto et al. |
| 2003/0197663 A1 | 10/2003 | Lee et al. |
| 2003/0214465 A1 | 11/2003 | Kimura |
| 2003/0227262 A1 | 12/2003 | Kwon |
| 2003/0230141 A1 | 12/2003 | Gilmour et al. |
| 2003/0230980 A1 | 12/2003 | Forrest et al. |
| 2004/0004443 A1 * | 1/2004 | Park ...................... G09G 3/3233 315/169.1 |
| 2004/0004589 A1 | 1/2004 | Shih |
| 2004/0032382 A1 | 2/2004 | Cok et al. |
| 2004/0041750 A1 | 3/2004 | Abe |
| 2004/0066357 A1 | 4/2004 | Kawasaki |
| 2004/0070557 A1 | 4/2004 | Asano et al. |
| 2004/0129933 A1 | 7/2004 | Nathan et al. |
| 2004/0135749 A1 | 7/2004 | Kondakov et al. |
| 2004/0145547 A1 | 7/2004 | Oh |
| 2004/0150595 A1 | 8/2004 | Kasai |
| 2004/0155841 A1 | 8/2004 | Kasai |
| 2004/0160516 A1 | 8/2004 | Ford |
| 2004/0171619 A1 | 9/2004 | Libsch et al. |
| 2004/0174349 A1 | 9/2004 | Libsch |
| 2004/0174354 A1 | 9/2004 | Ono |
| 2004/0179005 A1 * | 9/2004 | Jo ........................ G09G 3/325 345/211 |
| 2004/0183759 A1 | 9/2004 | Stevenson et al. |
| 2004/0189627 A1 | 9/2004 | Shirasaki et al. |
| 2004/0196275 A1 | 10/2004 | Hattori |
| 2004/0227697 A1 | 11/2004 | Mori |
| 2004/0228369 A1 * | 11/2004 | Simmons, III ...... H04Q 11/0471 370/537 |
| 2004/0239696 A1 | 12/2004 | Okabe |
| 2004/0251844 A1 | 12/2004 | Hashido et al. |
| 2004/0252085 A1 | 12/2004 | Miyagawa |
| 2004/0252089 A1 | 12/2004 | Ono et al. |
| 2004/0256617 A1 | 12/2004 | Yamada et al. |
| 2004/0257353 A1 | 12/2004 | Imamura et al. |
| 2004/0257355 A1 | 12/2004 | Naugler |
| 2004/0263437 A1 | 12/2004 | Hattori |
| 2004/0263506 A1 * | 12/2004 | Koyama ............. G09G 3/3225 345/204 |
| 2005/0007357 A1 | 1/2005 | Yamashita et al. |
| 2005/0052379 A1 | 3/2005 | Waterman |
| 2005/0057459 A1 | 3/2005 | Miyazawa |
| 2005/0067970 A1 | 3/2005 | Libsch et al. |
| 2005/0067971 A1 | 3/2005 | Kane |
| 2005/0083270 A1 | 4/2005 | Miyazawa |
| 2005/0110420 A1 | 5/2005 | Arnold et al. |

(56) References Cited

U.S. PATENT DOCUMENTS

| | | |
|---|---|---|
| 2005/0110727 A1 | 5/2005 | Shin |
| 2005/0123193 A1 | 6/2005 | Lamberg et al. |
| 2005/0140610 A1 | 6/2005 | Smith et al. |
| 2005/0145891 A1 | 7/2005 | Abe |
| 2005/0156831 A1 | 7/2005 | Yamazaki et al. |
| 2005/0168416 A1 | 8/2005 | Hashimoto et al. |
| 2005/0206590 A1 | 9/2005 | Sasaki et al. |
| 2005/0219188 A1 | 10/2005 | Kawabe et al. |
| 2005/0243037 A1 | 11/2005 | Eom et al. |
| 2005/0248515 A1 | 11/2005 | Naugler et al. |
| 2005/0258867 A1 | 11/2005 | Miyazawa |
| 2005/0285825 A1 | 12/2005 | Eom et al. |
| 2006/0012310 A1* | 1/2006 | Chen .............. G09G 3/3233 315/169.3 |
| 2006/0012311 A1 | 1/2006 | Ogawa |
| 2006/0038750 A1 | 2/2006 | Inoue et al. |
| 2006/0038758 A1 | 2/2006 | Routley et al. |
| 2006/0038762 A1 | 2/2006 | Chou |
| 2006/0066533 A1 | 3/2006 | Sato et al. |
| 2006/0071887 A1* | 4/2006 | Chou .............. G09G 3/3233 345/82 |
| 2006/0077077 A1 | 4/2006 | Kwon |
| 2006/0092185 A1 | 5/2006 | Jo et al. |
| 2006/0125408 A1 | 6/2006 | Nathan et al. |
| 2006/0139253 A1 | 6/2006 | Choi et al. |
| 2006/0145964 A1 | 7/2006 | Park et al. |
| 2006/0158402 A1* | 7/2006 | Nathan et al. .............. 345/82 |
| 2006/0191178 A1 | 8/2006 | Sempel et al. |
| 2006/0209012 A1 | 9/2006 | Hagood, IV |
| 2006/0214888 A1 | 9/2006 | Schneider et al. |
| 2006/0221009 A1 | 10/2006 | Miwa |
| 2006/0227082 A1 | 10/2006 | Ogata et al. |
| 2006/0232522 A1 | 10/2006 | Roy et al. |
| 2006/0244391 A1 | 11/2006 | Shishido et al. |
| 2006/0244697 A1 | 11/2006 | Lee et al. |
| 2006/0261841 A1 | 11/2006 | Fish |
| 2006/0290614 A1 | 12/2006 | Nathan et al. |
| 2007/0001939 A1 | 1/2007 | Hashimoto et al. |
| 2007/0001945 A1 | 1/2007 | Yoshida et al. |
| 2007/0008251 A1 | 1/2007 | Kohno et al. |
| 2007/0008297 A1 | 1/2007 | Bassetti |
| 2007/0035340 A1* | 2/2007 | Kimura .............. G09G 3/325 327/524 |
| 2007/0035489 A1 | 2/2007 | Lee |
| 2007/0035707 A1 | 2/2007 | Margulis |
| 2007/0040773 A1 | 2/2007 | Lee et al. |
| 2007/0040782 A1 | 2/2007 | Woo et al. |
| 2007/0063932 A1 | 3/2007 | Nathan et al. |
| 2007/0063959 A1* | 3/2007 | Iwabuchi .............. G09G 3/2074 345/100 |
| 2007/0080908 A1 | 4/2007 | Nathan et al. |
| 2007/0085801 A1 | 4/2007 | Park et al. |
| 2007/0091050 A1* | 4/2007 | Katayama .............. G09G 3/3688 345/98 |
| 2007/0109232 A1 | 5/2007 | Yamamoto et al. |
| 2007/0126000 A1* | 6/2007 | Lin .............. H01L 27/1285 257/40 |
| 2007/0128583 A1 | 6/2007 | Miyazawa |
| 2007/0164941 A1 | 7/2007 | Park et al. |
| 2007/0176918 A1* | 8/2007 | Aho .............. G09G 3/20 345/211 |
| 2007/0182671 A1 | 8/2007 | Nathan et al. |
| 2007/0236430 A1 | 10/2007 | Fish |
| 2007/0241999 A1 | 10/2007 | Lin |
| 2007/0242008 A1 | 10/2007 | Cummings |
| 2007/0296684 A1* | 12/2007 | Thomas .............. G09G 3/3426 345/102 |
| 2008/0001544 A1 | 1/2008 | Murakami et al. |
| 2008/0043044 A1 | 2/2008 | Woo et al. |
| 2008/0048951 A1 | 2/2008 | Naugler et al. |
| 2008/0055134 A1 | 3/2008 | Li et al. |
| 2008/0068307 A1* | 3/2008 | Kawabe .............. G09G 3/3291 345/80 |
| 2008/0074360 A1 | 3/2008 | Lu et al. |
| 2008/0088549 A1* | 4/2008 | Nathan et al. .............. 345/80 |
| 2008/0094426 A1 | 4/2008 | Kimpe |
| 2008/0122819 A1 | 5/2008 | Cho et al. |
| 2008/0129906 A1 | 6/2008 | Lin et al. |
| 2008/0180356 A1* | 7/2008 | Minami .............. G09G 3/3233 345/55 |
| 2008/0228562 A1 | 9/2008 | Smith et al. |
| 2008/0231641 A1 | 9/2008 | Miyashita |
| 2008/0252590 A1* | 10/2008 | Doi .............. G09G 3/342 345/102 |
| 2008/0265786 A1 | 10/2008 | Koyama |
| 2008/0290805 A1 | 11/2008 | Yamada et al. |
| 2008/0291223 A1* | 11/2008 | Yamazaki .............. G09G 3/3614 345/690 |
| 2008/0315788 A1 | 12/2008 | Levey |
| 2009/0009459 A1 | 1/2009 | Miyashita |
| 2009/0015532 A1 | 1/2009 | Katayama et al. |
| 2009/0058789 A1 | 3/2009 | Hung et al. |
| 2009/0121988 A1 | 5/2009 | Amo et al. |
| 2009/0146926 A1 | 6/2009 | Sung et al. |
| 2009/0153448 A1 | 6/2009 | Tomida et al. |
| 2009/0153459 A9 | 6/2009 | Han et al. |
| 2009/0174628 A1 | 7/2009 | Wang et al. |
| 2009/0201230 A1 | 8/2009 | Smith |
| 2009/0201281 A1 | 8/2009 | Routley et al. |
| 2009/0207160 A1* | 8/2009 | Shirasaki .............. G09G 3/3233 345/212 |
| 2009/0251452 A1* | 10/2009 | Kang .............. G09G 3/3233 345/211 |
| 2009/0251486 A1 | 10/2009 | Sakakibara et al. |
| 2009/0278777 A1 | 11/2009 | Wang et al. |
| 2009/0289964 A1 | 11/2009 | Miyachi |
| 2009/0295423 A1* | 12/2009 | Levey .............. 324/769 |
| 2010/0033469 A1* | 2/2010 | Nathan et al. .............. 345/211 |
| 2010/0039451 A1 | 2/2010 | Jung |
| 2010/0039453 A1 | 2/2010 | Nathan et al. |
| 2010/0045646 A1* | 2/2010 | Kishi .............. 345/211 |
| 2010/0066714 A1* | 3/2010 | Ozaki .............. G09G 3/2081 345/207 |
| 2010/0103082 A1 | 4/2010 | Levey |
| 2010/0103159 A1 | 4/2010 | Leon |
| 2010/0129997 A1* | 5/2010 | Lin .............. H01L 27/1285 438/510 |
| 2010/0134475 A1* | 6/2010 | Ogura et al. .............. 345/213 |
| 2010/0141626 A1* | 6/2010 | Tomida .............. G09G 3/3233 345/211 |
| 2010/0207920 A1 | 8/2010 | Chaji et al. |
| 2010/0225634 A1 | 9/2010 | Levey et al. |
| 2010/0251295 A1 | 9/2010 | Amento et al. |
| 2010/0269889 A1 | 10/2010 | Reinhold et al. |
| 2010/0277400 A1 | 11/2010 | Jeong |
| 2010/0315319 A1 | 12/2010 | Cok et al. |
| 2011/0050741 A1 | 3/2011 | Jeong |
| 2011/0069089 A1 | 3/2011 | Kopf et al. |
| 2011/0074762 A1* | 3/2011 | Shirasaki et al. .............. 345/211 |
| 2011/0157134 A1* | 6/2011 | Ogura .............. G09G 3/20 345/211 |
| 2011/0191042 A1* | 8/2011 | Chaji et al. .............. 702/64 |
| 2011/0205221 A1* | 8/2011 | Lin et al. .............. 345/213 |
| 2011/0205250 A1 | 8/2011 | Yoo et al. |
| 2012/0054672 A1* | 3/2012 | McDowell .............. G09B 17/003 715/784 |
| 2012/0169608 A1* | 7/2012 | Forutanpour .............. G09G 3/342 345/173 |
| 2012/0169793 A1* | 7/2012 | Nathan et al. .............. 345/690 |
| 2012/0280962 A1* | 11/2012 | Kawabe .............. G09G 3/3233 345/211 |
| 2012/0293481 A1* | 11/2012 | Chaji .............. G06F 3/038 345/212 |
| 2012/0299976 A1 | 11/2012 | Chen et al. |
| 2012/0299978 A1* | 11/2012 | Chaji .............. 345/690 |
| 2013/0099692 A1 | 4/2013 | Chaji |
| 2014/0225883 A1 | 8/2014 | Chaji |

(56) References Cited

U.S. PATENT DOCUMENTS

| | | |
|---|---|---|
| 2014/0252988 A1 | 9/2014 | Azizi et al. |
| 2014/0267215 A1* | 9/2014 | Soni et al. .............. 345/212 |

FOREIGN PATENT DOCUMENTS

| | | |
|---|---|---|
| CA | 1 294 034 | 1/1992 |
| CA | 2 249 592 | 7/1998 |
| CA | 2 303 302 | 3/1999 |
| CA | 2 368 386 | 9/1999 |
| CA | 2 242 720 | 1/2000 |
| CA | 2 354 018 | 6/2000 |
| CA | 2 432 530 | 7/2002 |
| CA | 2 436 451 | 8/2002 |
| CA | 2 507 276 | 8/2002 |
| CA | 2 463 653 | 1/2004 |
| CA | 2 498 136 | 3/2004 |
| CA | 2 522 396 | 11/2004 |
| CA | 2 438 363 | 2/2005 |
| CA | 2 443 206 | 3/2005 |
| CA | 2 519 097 | 3/2005 |
| CA | 2 472 671 | 12/2005 |
| CA | 2 523 841 | 1/2006 |
| CA | 2 567 076 | 1/2006 |
| CA | 2 495 726 | 7/2006 |
| CA | 2 557 713 | 11/2006 |
| CA | 2 526 782 C | 8/2007 |
| CA | 2 651 893 | 11/2007 |
| CA | 2 672 590 | 10/2009 |
| CN | 1601594 A | 3/2005 |
| CN | 1886774 | 12/2006 |
| CN | 101116129 A | 1/2008 |
| CN | 101978412 A | 2/2011 |
| CN | 102741910 A | 10/2012 |
| CN | 104036719 | 9/2014 |
| DE | 202006007613 | 9/2006 |
| EP | 0 478 186 | 4/1992 |
| EP | 1 028 471 A | 8/2000 |
| EP | 1 130 565 A1 | 9/2001 |
| EP | 1 194 013 | 4/2002 |
| EP | 1 321 922 | 6/2003 |
| EP | 1 335 430 A1 | 8/2003 |
| EP | 1 381 019 | 1/2004 |
| EP | 1 429 312 A | 6/2004 |
| EP | 1 439 520 A2 | 7/2004 |
| EP | 1 465 143 A | 10/2004 |
| EP | 1 473 689 A | 11/2004 |
| EP | 1 517 290 A2 | 3/2005 |
| EP | 1 521 203 A2 | 4/2005 |
| EP | 2 133 860 A1 | 12/2009 |
| EP | 2 383 720 A2 | 11/2011 |
| EP | 2458579 A2 | 5/2012 |
| GB | 2 399 935 | 9/2004 |
| GB | 2 460 018 | 11/2009 |
| JP | 09 090405 | 4/1997 |
| JP | 10-254410 | 9/1998 |
| JP | 11 231805 | 8/1999 |
| JP | 2002-278513 | 9/2002 |
| JP | 2003-076331 | 3/2003 |
| JP | 2003-099000 | 4/2003 |
| JP | 2003-173165 | 6/2003 |
| JP | 2003-186439 | 7/2003 |
| JP | 2003-195809 | 7/2003 |
| JP | 2003-271095 | 9/2003 |
| JP | 2003-308046 | 10/2003 |
| JP | 2004-054188 | 2/2004 |
| JP | 2004-226960 | 8/2004 |
| JP | 2005-004147 | 1/2005 |
| JP | 2005-099715 | 4/2005 |
| JP | 2005-258326 | 9/2005 |
| JP | 2005-338819 | 12/2005 |
| TW | 569173 | 1/2004 |
| TW | 200526065 | 8/2005 |
| TW | 1239501 | 9/2005 |
| WO | WO 98/11554 | 3/1998 |
| WO | WO 99/48079 | 9/1999 |
| WO | WO 01/27910 A1 | 4/2001 |
| WO | WO 02/067327 A | 8/2002 |
| WO | WO 03/034389 | 4/2003 |
| WO | WO 03/063124 | 7/2003 |
| WO | WO 03/075256 | 9/2003 |
| WO | WO 2004/003877 | 1/2004 |
| WO | WO 2004/015668 A1 | 2/2004 |
| WO | WO 2004/034364 | 4/2004 |
| WO | WO 2004/086347 A2 | 10/2004 |
| WO | WO 2005/022498 | 3/2005 |
| WO | WO 2005/055185 | 6/2005 |
| WO | WO 2005/055186 A1 | 6/2005 |
| WO | WO 2005/069267 | 7/2005 |
| WO | WO 2005/122121 | 12/2005 |
| WO | WO 2006/063448 | 6/2006 |
| WO | WO 2006/128069 | 11/2006 |
| WO | WO 2008/057369 | 5/2008 |
| WO | WO 2008/0290805 | 11/2008 |
| WO | WO 2009/059028 | 5/2009 |
| WO | WO 2009/127065 | 10/2009 |
| WO | WO 2010/066030 | 6/2010 |
| WO | WO 2010/120733 | 10/2010 |

OTHER PUBLICATIONS

Alexander et al.: "Pixel circuits and drive schemes for glass and elastic AMOLED displays"; dated Jul. 2005 (9 pages).

Alexander et al.: "Unique Electrical Measurement Technology for Compensation Inspection and Process Diagnostics of AMOLED HDTV"; dated May 2010 (4 pages).

Ashtiani et al.: "AMOLED Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A novel driving scheme for high-resolution large-area a-Si:H AMOLED displays"; dated Aug. 2005 (4 pages).

Chaji et al.: "A Stable Voltage-Programmed Pixel Circuit for a-Si:H AMOLED Displays"; dated Dec. 2006 (12 pages).

Chaji et al.: "A Sub-μA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "Electrical Compensation of OLED Luminance Degradation"; dated Dec. 2007 (3 pages).

Chaji et al.: "eUTDSP: a design study of a new VLIW-based DSP architecture"; dated May 2003 (4 pages).

Chaji et al.: "Fast and Offset-Leakage Insensitive Current-Mode Line Driver for Active Matrix Displays and Sensors"; dated Feb. 2009 (8 pages).

Chaji et al.: "High Speed Low Power Adder Design With a New Logic Style: Pseudo Dynamic Logic (SDL)"; dated Oct. 2001 (4 pages).

(56) References Cited

OTHER PUBLICATIONS

Chaji et al.: "High-precision fast current source for large-area current-programmed a-Si flat panels"; dated Sep. 2006 (4 pages).
Chaji et al.: "Low-Cost AMOLED Television with IGNIS Compensating Technology"; dated May 2008 (4 pages).
Chaji et al.: "Low-Cost Stable a-Si:H AMOLED Display for Portable Applications"; dated Jun. 2006 (4 pages).
Chaji et al.: "Low-Power Low-Cost Voltage-Programmed a-Si:H AMOLED Display"; dated Jun. 2008 (5 pages).
Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High- Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated May 2008 (177 pages).
Chapter 3: Color Spaces" Keith Jack: "Video Demystified: "A Handbook for the Digital Engineer" 2001 Referex ORD-0000-00-00 USA EP040425529 ISBN: 1-878707-56-6 pp. 32-33.
Chapter 8: Alternative Flat Panel Display 1-25 Technologies; Willem den Boer: "Active Matrix Liquid Crystal Display: Fundamentals and Applications" 2005 Referex ORD-0000-00-00 U.K.; XP040426102 ISBN: 0-7506-7813-5 pp. 206-209 p. 208.
European Partial Search Report Application No. 12 15 6251.6 European Patent Office dated May 30, 2012 (7 pages).
European Patent Office Communication Application No. 05 82 1114 dated Jan. 11, 2013 (9 pages).
European Patent Office Communication with Supplemental European Search Report for EP Application No. 07 70 1644.2, dated Aug. 18, 2009 (12 pages).
European Search Report Application No. 10 83 4294.0-1903 dated Apr. 8, 2013 (9 pages).
European Search Report Application No. EP 05 80 7905 dated Mar. 18, 2009 (5 pages).
European Search Report Application No. EP 05 82 1114 dated Mar. 27, 2009 (2 pages).
European Search Report Application No. EP 07 70 1644 dated Aug. 5, 2009 (5 pages).
European Search Report Application No. EP 10 17 5764—dated Oct. 18 2010 (11 pages).
European Search Report Application No. EP 10 82 9593.2— European Patent Office dated May 17, 2013 (7 pages).
European Search Report Application No. EP 12 15 6251.6 European Patent Office dated Oct. 12, 2012 (18 pages).
European Search Report Application No. EP. 11 175 225.9 dated Nov. 4, 2011 (10 pages).
European Supplementary Search Report Application No. EP 09 80 2309 dated May 8, 2011 (14 pages).
European Supplementary Search Report Application No. EP 09 83 1339.8 dated Mar. 26, 2012 (11 pages).
Extended European Search Report Application No. EP 06 75 2777.0 dated Dec. 3, 2010 (21 pages).
Extended European Search Report Application No. EP 09 73 2338.0 dated May 24, 2011 (9 pages).
Extended European Search Report Application No. EP 11 17 5223., 4 mailed Nov. 8, 2011 (8 pages).
Extended European Search Report Application No. EP 12 17 4465.0 European Patent Office dated Sep. 7, 2012 (9 pages).
Fan et al. "LTPS_TFT Pixel Circuit Compensation for TFT Threshold Voltage Shift and IR-Drop on the Power Line for Amolded Displays" 5 pages copyright 2012.
Goh et al. "A New a-Si:H Thin-Film Transistor Pixel Circuit for Active-Matrix Organic Light-Emitting Diodes" IEEE Electron Device Letters vol. 24 No. 9 Sep. 2003 pp. 583-585.
International Search Report Application No. PCT/CA2005/001844 dated Mar. 28, 2006 (2 pages).
International Search Report Application No. PCT/CA2006/000941 dated Oct. 3, 2006 (2 pages).
International Search Report Application No. PCT/CA2007/000013 dated May 7, 2007 (2 pages).
International Search Report Application No. PCT/CA2009/001049 mailed Dec. 7, 2009 (4 pages).
International Search Report Application No. PCT/CA2009/001769 dated Apr. 8, 2010 (8 pages).
International Search Report Application No. PCT/IB2010/002898 Canadian Intellectual Property Office dated Mar. 30, 2011 (5 pages).
International Search Report Application No. PCT/IB2010/055481 dated Apr. 7, 2011 (3 pages).
International Search Report Application No. PCT/IB2011/051103 dated Jul. 8, 2011 2 pages.
International Search Report Application No. PCT/IB2012/052651 5 pages dated Sep. 11, 2012.
International Searching Authority Written Opinion Application No. PCT/IB2010/055481 dated Apr. 7, 2011 (6 pages ).
International Searching Authority Written Opinion Application No. PCT/IB2012/052651 6 pages dated Sep. 11, 2012.
International Searching Authority Written Opinion Application No. PCT/IB2011/051103 dated Jul. 8, 2011 6 pages.
International Searching Authority Written Opinion Application No. PCT/IB2010/002898 Canadian Intellectual Property Office dated Mar. 30, 2011 (8 pages).
International Searching Authority Written Opinion Application No. PCT/CA2009/001769 dated Apr. 8 2010 (8 pages).
Jafarabadiashtiani et al.: "A New Driving Method for a-Si AMOLED Displays Based on Voltage Feedback"; dated May 2005 (4 pages).
Lee et al.: "Ambipolar Thin-Film Transistors Fabricated by PECVD Nanocrystalline Silicon"; dated May 2006 (6 pages).
Ma e y et al: "Organic Light-Emitting Diode/Thin Film Transistor Integration for foldable Displays" Conference record of the 1997 International display research conference and international workshops on LCD technology and emissive technology. Toronto Sep. 15-19, 1997 (6 pages).
Matsueda y et al.: "35.1: 2.5-in. AMOLED with Integrated 6-bit Gamma Compensated Digital Data Driver"; dated May 2004 (4 pages).
Nathan et al. "Amorphous Silicon Thin Film Transistor Circuit Integration for Organic LED Displays on Glass and Plastic" IEEE Journal of Solid-State Circuits vol. 39 No. 9 Sep. 2004 pp. 1477-1486.
Nathan et al.: "Backplane Requirements for Active Matrix Organic Light Emitting Diode Displays"; dated Sep. 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a -Si for AMOLED—Meeting the Performance and Cost Demands of Display Applications (Cell Phone to HDTV)"; dated Jun. 2006 (4 pages).
Nathan et al.: "Thin film imaging technology on glass and plastic"; dated Oct. 31-Nov. 2, 2000 (4 pages).
Ono et al. "Shared Pixel Compensation Circuit for AM-OLED Displays" Proceedings of the 9$^{th}$ Asian Symposium on Information Display (ASID) pp. 462-465 New Delhi dated Oct. 8-12, 2006 (4 pages).
Philipp: "Charge transfer sensing" Sensor Review vol. 19 No. 2 Dec. 31, 1999 (Dec. 31, 1999) 10 pages.
Rafati et al.: "Comparison of a 17 b multiplier in Dual-rail domino and in Dual-rail D L (D L) logic styles"; dated 2002 (4 pages).

(56) References Cited

OTHER PUBLICATIONS

Safavaian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Smith, Lindsay I., "A tutorial on Principal Components Analysis," dated Feb. 26, 2001 (27 pages).
Stewart M. et al. "Polysilicon TFT technology for active matrix OLED displays" IEEE transactions on electron devices vol. 48 No. 5 May 2001 (7 pages).
Vygranenko et al.: "Stability of indium-oxide thin-film transistors by reactive ion beam assisted deposition"; dated Feb. 2009.
Wang et al.: "Indium oxides by reactive ion beam assisted evaporation: From material study to device application," dated Mar. 2009 (6 pages).
Yi He et al. "Current-Source a-Si:H Thin Film Transistor Circuit for Active-Matrix Organic Light-Emitting Displays" IEEE Electron Device Letters vol. 21 No. 12 Dec. 2000 pp. 590-592.
International Search Report Application No. PCT/IB2013/059074, dated Dec. 18, 2013 (5 pages).
International Searching Authority Written Opinion Application No. PCT/IB2013/059074, dated Dec. 18, 2013 (8 pages ).
International Search Report Application No. 14157112.5-1903, dated Aug. 21, 2014 (7 pages).
Chao et al., "A New AMOLED Pixel Circuit With Pulsed Drive and Reverse Bias to Alleviate OLED Degradation", IEEE Transactions on Electron Devices, Apr. 2012, vol. 59 Issue 4, pp. 1123-1130.
Lin et al., "Lifetime Amelioration for an AMOLED Pixel Circuit by Using a Novel AC Driving Scheme", IEEE Transactions on Electron Devices, Aug. 2011, vol. 58, Issue 8, pp. 2652-2659.
Servati et al., "Static Characteristics of a-Si:H Dual-Gate TFTs", IEEE Transactions on Electron Devices, Apr. 2003, vol. 50. Issue 4, pp. 926-932.
International Search Report, PCTIB2016/053592, date of mailing Sep. 26, 2016 (7 pages).
Written Opinion of the International Searching Authority, PCTIB2016/053592, date of mailing Sep. 26, 2016 (5 pages).

\* cited by examiner

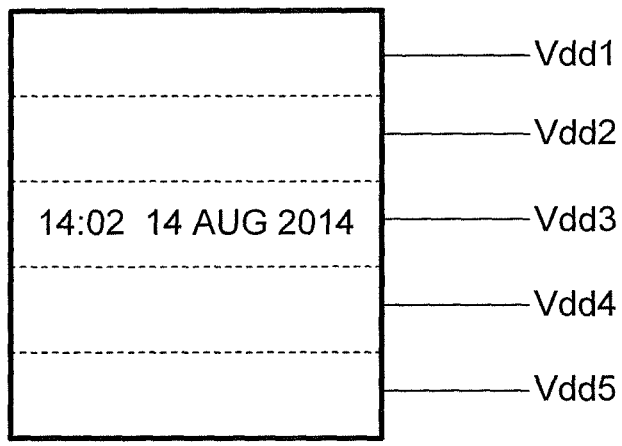
FIG. 7
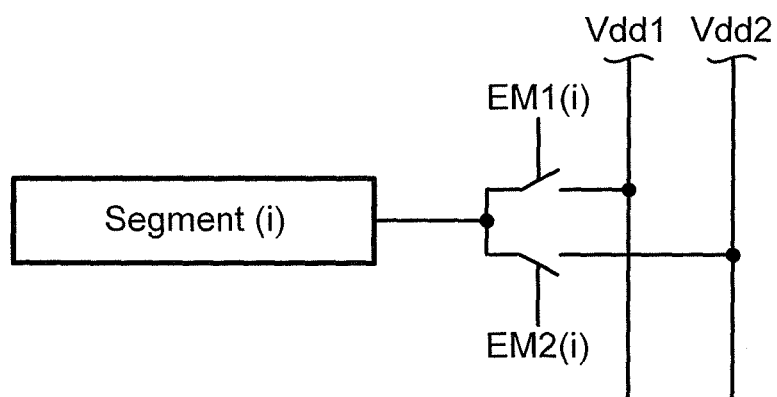
FIG. 8
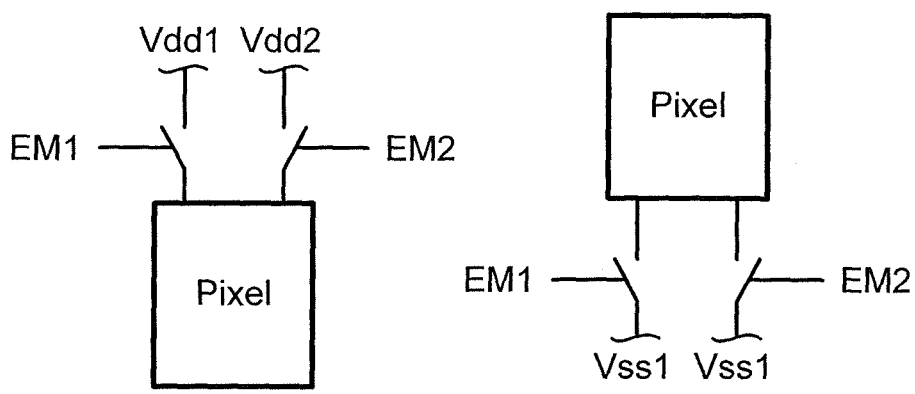
FIG. 9A        FIG. 9B

PIXEL CIRCUITS FOR AMOLED DISPLAYS

CROSS REFERENCE TO RELATED APPLICATIONS

This application is a continuation-in-part and claims priority to U.S. patent application Ser. No. 14/459,979, filed Aug. 14, 2014, which is a continuation-in-part of U.S. patent application Ser. No. 13/474,131, filed May 17, 2012, which claims the benefit of U.S. Provisional Patent Application No. 61/487,272, filed May 17, 2011, each of which is incorporated herein by reference in its entirety.

This application is also a continuation-in-part of and claims the benefit of U.S. patent application Ser. No. 14/474,977, filed Sep. 2, 2014, which is a continuation-in-part of Ser. No. 13/789,978, filed Mar. 8, 2013, each of which is hereby incorporated by reference in its entirety.

FIELD OF THE INVENTION

The present disclosure generally relates to circuits for use in displays, and methods of driving, calibrating, and programming displays, particularly displays such as active matrix organic light emitting diode displays.

BACKGROUND

Displays can be created from an array of light emitting devices each controlled by individual circuits (i.e., pixel circuits) having transistors for selectively controlling the circuits to be programmed with display information and to emit light according to the display information. Thin film transistors ("TFTs") fabricated on a substrate can be incorporated into such displays. TFTs tend to demonstrate non-uniform behavior across display panels and over time as the displays age. Compensation techniques can be applied to such displays to achieve image uniformity across the displays and to account for degradation in the displays as the displays age.

Some schemes for providing compensation to displays to account for variations across the display panel and over time utilize monitoring systems to measure time dependent parameters associated with the aging (i.e., degradation) of the pixel circuits. The measured information can then be used to inform subsequent programming of the pixel circuits so as to ensure that any measured degradation is accounted for by adjustments made to the programming. Such monitored pixel circuits may require the use of additional transistors and/or lines to selectively couple the pixel circuits to the monitoring systems and provide for reading out information. The incorporation of additional transistors and/or lines may undesirably decrease pixel-pitch (i.e., "pixel density").

SUMMARY

In accordance with one embodiment, a method and system are provided for driving a display that includes a plurality of pixel circuits arranged in an array. Each of the pixel circuits includes a light emitting device and a driving transistor for conveying a driving current through the light emitting device. Each of a first plurality of supply lines is associated with at least one pixel circuit in a preselected segment of the array, the first plurality of supply lines providing driving currents to the at least one pixel circuit in the preselected segment. Each of a plurality of voltage supplies is configured to provide a supply voltage to the at least one pixel circuit in the preselected segment of the array, the voltage supplies being controllably coupled to the pixel circuits in the preselected segment of the array. A controller determines which of the plurality of voltage supplies to connect to the preselected segment of the array.

In one implementation, controllable switches couple the voltage supplies to the at least one pixel circuit in the preselected segment of the array.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

FIG. 7 is a diagrammatic illustration of a display with segmented VDD for power saving.

FIG. 8 is a schematic diagram of an electrical circuit for adjusting the power supply at a segment level.

FIG. 9A is a schematic diagram of an electrical circuit for adjusting the power supply to a pixel from Vdd sources.

FIG. 9B is a schematic diagram of an electrical circuit for adjusting the power supply to a pixel from Vss sources.

Figure 1:
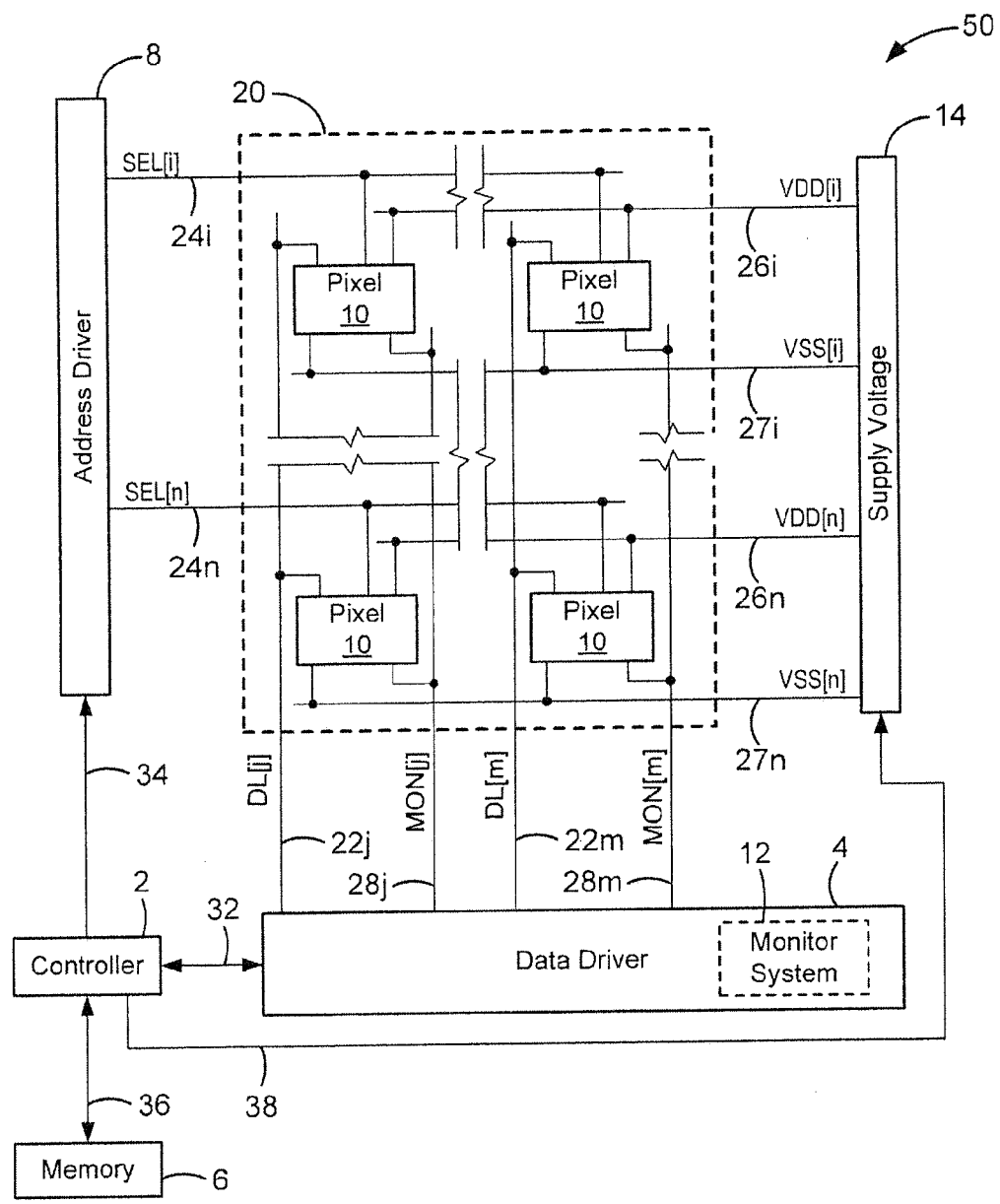
FIG. 1 is a block diagram of an exemplary configuration of a system for driving an OLED display while monitoring the degradation of the individual pixels and providing compensation therefor.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a diagram of an exemplary display system 50. The display system 50 includes an address driver 8, a data driver 4, a controller 2, a memory storage 6, and display panel 20. The display panel 20 includes an array of pixels 10 arranged in rows and columns. Each of the pixels 10 is individually programmable to emit light with individually programmable luminance values. The controller 2 receives digital data indicative of information to be displayed on the display panel 20. The controller 2 sends signals 32 to the data driver 4 and scheduling signals 34 to the address driver 8 to drive the pixels 10 in the display panel 20 to display the information indicated. The plurality of pixels 10 associated with the display panel 20 thus comprise a display array ("display screen") adapted to dynamically display information according to the input digital data received by the controller 2. The display screen can display, for example, video information from a stream of video data received by the controller 2. The supply voltage 14 can provide a constant power voltage or can be an adjustable voltage supply that is controlled by signals from the controller 2. The display system 50 can also incorporate features from a current source or sink (not shown) to provide biasing currents to the pixels 10 in the display panel 20 to thereby decrease programming time for the pixels 10.

For illustrative purposes, the display system 50 in FIG. 1 is illustrated with only four pixels 10 in the display panel 20. It is understood that the display system 50 can be implemented with a display screen that includes an array of similar pixels, such as the pixels 10, and that the display screen is not limited to a particular number of rows and columns of pixels. For example, the display system 50 can be implemented with a display screen with a number of rows and columns of pixels commonly available in displays for mobile devices, monitor-based devices, and/or projection-devices.

The pixel 10 is operated by a driving circuit ("pixel circuit") that generally includes a driving transistor and a light emitting device. Hereinafter the pixel 10 may refer to the pixel circuit. The light emitting device can optionally be an organic light emitting diode, but implementations of the present disclosure apply to pixel circuits having other electroluminescence devices, including current-driven light emitting devices. The driving transistor in the pixel 10 can optionally be an n-type or p-type amorphous silicon thin-film transistor, but implementations of the present disclosure are not limited to pixel circuits having a particular polarity of transistor or only to pixel circuits having thin-film transistors. The pixel circuit 10 can also include a storage capacitor for storing programming information and allowing the pixel circuit 10 to drive the light emitting device after being addressed. Thus, the display panel 20 can be an active matrix display array.

As illustrated in FIG. 1, the pixel 10 illustrated as the top-left pixel in the display panel 20 is coupled to a select line 24*i*, a supply line 26*i*, a data line 22*j*, and a monitor line 28*j*. A read line may also be included for controlling connections to the monitor line. In one implementation, the supply voltage 14 can also provide a second supply line to the pixel 10. For example, each pixel can be coupled to a first supply line 26 charged with Vdd and a second supply line 27 coupled with Vss, and the pixel circuits 10 can be situated between the first and second supply lines to facilitate driving current between the two supply lines during an emission phase of the pixel circuit. The top-left pixel 10 in the display panel 20 can correspond to a pixel in the display panel in a "ith" row and "jth" column of the display panel 20. Similarly, the top-right pixel 10 in the display panel 20 represents a "jth" row and "mth" column; the bottom-left pixel 10 represents an "nth" row and "jth" column; and the bottom-right pixel 10 represents an "nth" row and "mth" column. Each of the pixels 10 is coupled to appropriate select lines (e.g., the select lines 24*i* and 24*n*), supply lines (e.g., the supply lines 26*i* and 26*n*), data lines (e.g., the data lines 22*j* and 22*m*), and monitor lines (e.g., the monitor lines 28*j* and 28*m*). It is noted that aspects of the present disclosure apply to pixels having additional connections, such as connections to additional select lines, and to pixels having fewer connections, such as pixels lacking a connection to a monitoring line.

With reference to the top-left pixel 10 shown in the display panel 20, the select line 24*i* is provided by the address driver 8, and can be utilized to enable, for example, a programming operation of the pixel 10 by activating a switch or transistor to allow the data line 22*j* to program the pixel 10. The data line 22*j* conveys programming information from the data driver 4 to the pixel 10. For example, the data line 22*j* can be utilized to apply a programming voltage or a programming current to the pixel 10 in order to program the pixel 10 to emit a desired amount of luminance. The programming voltage (or programming current) supplied by the data driver 4 via the data line 22*j* is a voltage (or current) appropriate to cause the pixel 10 to emit light with a desired amount of luminance according to the digital data received by the controller 2. The programming voltage (or programming current) can be applied to the pixel 10 during a programming operation of the pixel 10 so as to charge a storage device within the pixel 10, such as a storage capacitor, thereby enabling the pixel 10 to emit light with the desired amount of luminance during an emission operation following the programming operation. For example, the storage device in the pixel 10 can be charged during a programming operation to apply a voltage to one or more of a gate or a source terminal of the driving transistor during the emission operation, thereby causing the driving transistor to convey the driving current through the light emitting device according to the voltage stored on the storage device.

Generally, in the pixel 10, the driving current that is conveyed through the light emitting device by the driving transistor during the emission operation of the pixel 10 is a current that is supplied by the first supply line 26*i* and is drained to a second supply line 27*i*. The first supply line 26*i* and the second supply line 27*i* are coupled to the voltage supply 14. The first supply line 26*i* can provide a positive supply voltage (e.g., the voltage commonly referred to in circuit design as "Vdd") and the second supply line 27*i* can provide a negative supply voltage (e.g., the voltage commonly referred to in circuit design as "Vss"). Implementations of the present disclosure can be realized where one or the other of the supply lines (e.g., the supply line 27*i*) is fixed at a ground voltage or at another reference voltage.

The display system 50 also includes a monitoring system 12. With reference again to the top left pixel 10 in the display panel 20, the monitor line 28*j* connects the pixel 10 to the monitoring system 12. The monitoring system 12 can be integrated with the data driver 4, or can be a separate stand-alone system. In particular, the monitoring system 12 can optionally be implemented by monitoring the current and/or voltage of the data line 22*j* during a monitoring operation of the pixel 10, and the monitor line 28*j* can be entirely omitted. Additionally, the display system 50 can be implemented without the monitoring system 12 or the monitor line 28*j*. The monitor line 28*j* allows the monitoring system 12 to measure a current or voltage associated with the pixel 10 and thereby extract information indicative of a degradation of the pixel 10. For example, the monitoring system 12 can extract, via the monitor line 28*j*, a current flowing through the driving transistor within the pixel 10 and thereby determine, based on the measured current and based on the voltages applied to the driving transistor during the measurement, a threshold voltage of the driving transistor or a shift thereof.

The monitoring system 12 can also extract an operating voltage of the light emitting device (e.g., a voltage drop across the light emitting device while the light emitting device is operating to emit light). The monitoring system 12 can then communicate signals 32 to the controller 2 and/or the memory 6 to allow the display system 50 to store the extracted degradation information in the memory 6. During subsequent programming and/or emission operations of the pixel 10, the degradation information is retrieved from the memory 6 by the controller 2 via memory signals 36, and the controller 2 then compensates for the extracted degradation information in subsequent programming and/or emission operations of the pixel 10. For example, once the degradation information is extracted, the programming information conveyed to the pixel 10 via the data line 22*j* can be appropriately adjusted during a subsequent programming operation of the pixel 10 such that the pixel 10 emits light with a desired amount of luminance that is independent of the degradation of the pixel 10. In an example, an increase in the threshold voltage of the driving transistor within the pixel 10 can be compensated for by appropriately increasing the programming voltage applied to the pixel 10.

Figure 2A:
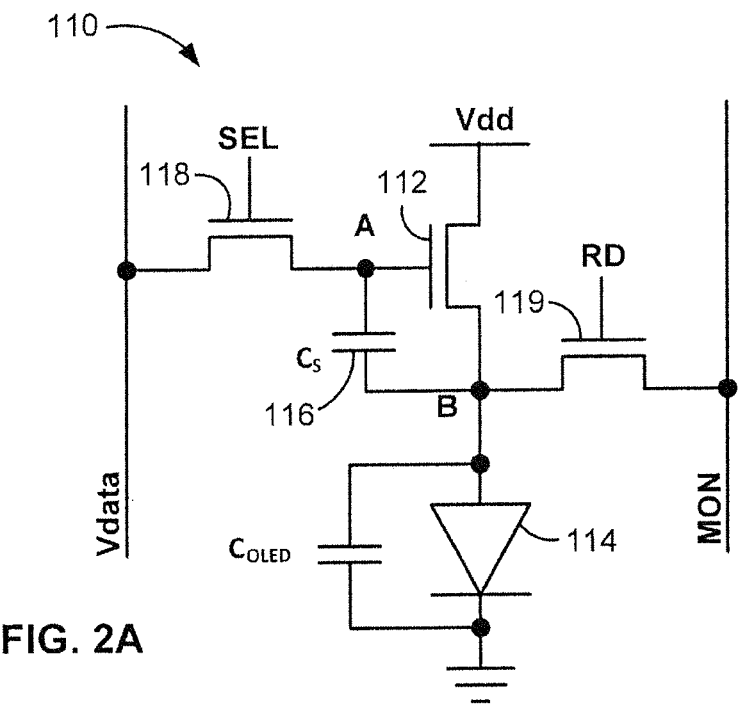
FIG. 2A is a circuit diagram of an exemplary pixel circuit configuration.

FIG. 2A is a circuit diagram of an exemplary driving circuit for a pixel 110. The driving circuit shown in FIG. 2A is utilized to calibrate, program and drive the pixel 110 and includes a drive transistor 112 for conveying a driving current through an organic light emitting diode ("OLED") 114. The OLED 114 emits light according to the current passing through the OLED 114, and can be replaced by any current-driven light emitting device. The OLED 114 has an inherent capacitance $C_{OLED}$. The pixel 110 can be utilized in the display panel 20 of the display system 50 described in connection with FIG. 1.

The driving circuit for the pixel 110 also includes a storage capacitor 116 and a switching transistor 118. The pixel 110 is coupled to a select line SEL, a voltage supply line Vdd, a data line Vdata, and a monitor line MON. The driving transistor 112 draws a current from the voltage supply line Vdd according to a gate-source voltage (Vgs) across the gate and source terminals of the drive transistor 112. For example, in a saturation mode of the drive transistor 112, the current passing through the drive transistor 112 can be given by $Ids=\beta(Vgs-Vt)^2$, where $\beta$ is a parameter that depends on device characteristics of the drive transistor 112, Ids is the current from the drain terminal to the source terminal of the drive transistor 112, and Vt is the threshold voltage of the drive transistor 112.

In the pixel 110, the storage capacitor 116 is coupled across the gate and source terminals of the drive transistor 112. The storage capacitor 116 has a first terminal, which is referred to for convenience as a gate-side terminal, and a second terminal, which is referred to for convenience as a source-side terminal. The gate-side terminal of the storage capacitor 116 is electrically coupled to the gate terminal of the drive transistor 112. The source-side terminal 116*s* of the storage capacitor 116 is electrically coupled to the source terminal of the drive transistor 112. Thus, the gate-source voltage Vgs of the drive transistor 112 is also the voltage charged on the storage capacitor 116. As will be explained further below, the storage capacitor 116 can thereby maintain a driving voltage across the drive transistor 112 during an emission phase of the pixel 110.

The drain terminal of the drive transistor 112 is connected to the voltage supply line Vdd, and the source terminal of the drive transistor 112 is connected to (1) the anode terminal of the OLED 114 and (2) a monitor line MON via a read transistor 119. A cathode terminal of the OLED 114 can be connected to ground or can optionally be connected to a second voltage supply line, such as the supply line Vss shown in FIG. 1. Thus, the OLED 114 is connected in series with the current path of the drive transistor 112. The OLED 114 emits light according to the magnitude of the current passing through the OLED 114, once a voltage drop across the anode and cathode terminals of the OLED achieves an operating voltage ($V_{OLED}$) of the OLED 114. That is, when the difference between the voltage on the anode terminal and the voltage on the cathode terminal is greater than the operating voltage $V_{OLED}$, the OLED 114 turns on and emits light. When the anode-to-cathode voltage is less than $V_{OLED}$, current does not pass through the OLED 114.

The switching transistor 118 is operated according to the select line SEL (e.g., when the voltage on the select line SEL is at a high level, the switching transistor 118 is turned on, and when the voltage SEL is at a low level, the switching transistor is turned off). When turned on, the switching transistor 118 electrically couples node A (the gate terminal of the driving transistor 112 and the gate-side terminal of the storage capacitor 116) to the data line Vdata.

The read transistor 119 is operated according to the read line RD (e.g., when the voltage on the read line RD is at a high level, the read transistor 119 is turned on, and when the voltage RD is at a low level, the read transistor 119 is turned off). When turned on, the read transistor 119 electrically couples node B (the source terminal of the driving transistor 112, the source-side terminal of the storage capacitor 116, and the anode of the OLED 114) to the monitor line MON.

Figure 2B:
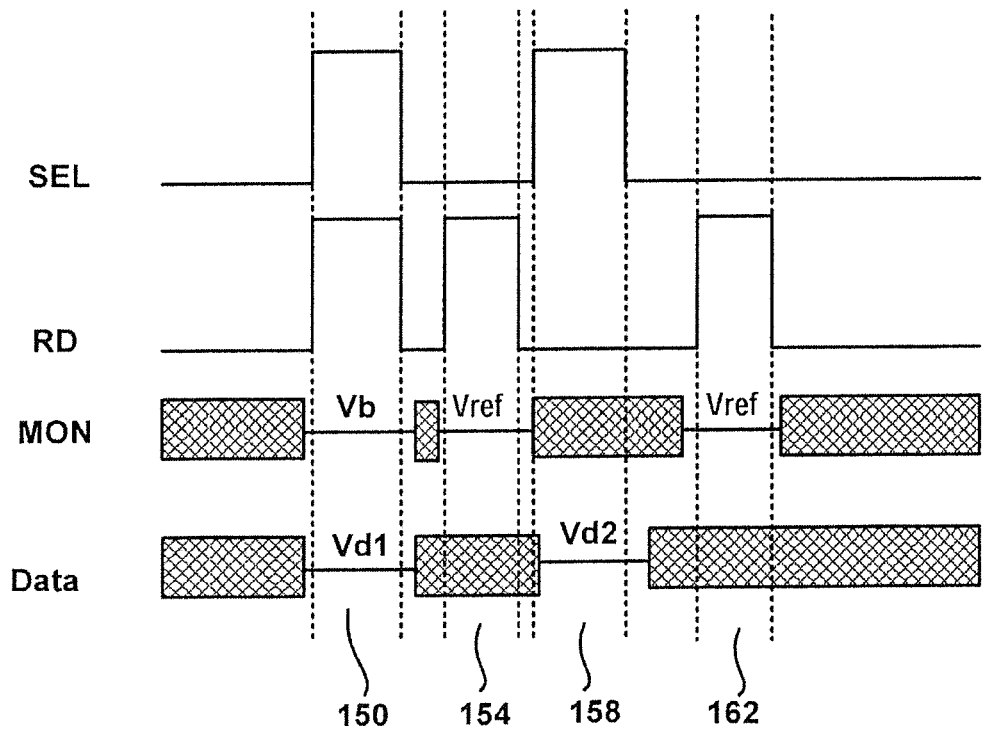
FIG. 2B is a timing diagram of first exemplary operation cycles for the pixel shown in FIG. 2A.

FIG. 2B is a timing diagram of exemplary operation cycles for the pixel 110 shown in FIG. 2A. During a first cycle 150, both the SEL line and the RD line are high, so the corresponding transistors 118 and 119 are turned on. The switching transistor 118 applies a voltage Vd1, which is at a level sufficient to turn on the drive transistor 112, from the data line Vdata to node A. The read transistor 119 applies a monitor-line voltage Vb, which is at a level that turns the OLED 114 off, from the monitor line MON to node B. As a result, the gate-source voltage Vgs is independent of $V_{OLED}$ (Vd1−Vb−Vds3, where Vds3 is the voltage drop across the read transistor 119). The SEL and RD lines go low at the end of the cycle 150, turning off the transistors 118 and 119.

During the second cycle 154, the SEL line is low to turn off the switching transistor 118, and the drive transistor 112 is turned on by the charge on the capacitor 116 at node A. The voltage on the read line RD goes high to turn on the read transistor 119 and thereby permit a first sample of the drive transistor current to be taken via the monitor line MON, while the OLED 114 is off. The voltage on the monitor line MON is Vref, which may be at the same level as the voltage Vb in the previous cycle.

During the third cycle 158, the voltage on the select line SEL is high to turn on the switching transistor 118, and the voltage on the read line RD is low to turn off the read transistor 119. Thus, the gate of the drive transistor 112 is charged to the voltage Vd2 of the data line Vdata, and the source of the drive transistor 112 is set to $V_{OLED}$ by the OLED 114. Consequently, the gate-source voltage Vgs of the drive transistor 112 is a function of $V_{OLED}$ (Vgs=Vd2−$V_{OLED}$).

During the fourth cycle 162, the voltage on the select line SEL is low to turn off the switching transistor, and the drive transistor 112 is turned on by the charge on the capacitor 116 at node A. The voltage on the read line RD is high to turn on the read transistor 119, and a second sample of the current of the drive transistor 112 is taken via the monitor line MON.

If the first and second samples of the drive current are not the same, the voltage Vd2 on the Vdata line is adjusted, the programming voltage Vd2 is changed, and the sampling and adjustment operations are repeated until the second sample of the drive current is the same as the first sample. When the two samples of the drive current are the same, the two gate-source voltages should also be the same, which means that:

$$V_{OLED} = Vd2 - Vgs$$
$$= Vd2 - (Vd1 - Vb - Vds3)$$
$$= Vd2 - Vd1 + Vb + Vds3.$$

After some operation time (t), the change in $V_{OLED}$ between time 0 and time t is $\Delta V_{OLED} = V_{OLED}(t) - V_{OLED}(0) = Vd2(t) - Vd2(0)$. Thus, the difference between the two programming voltages Vd2(t) and Vd2(0) can be used to extract the OLED voltage.

Figure 2C:
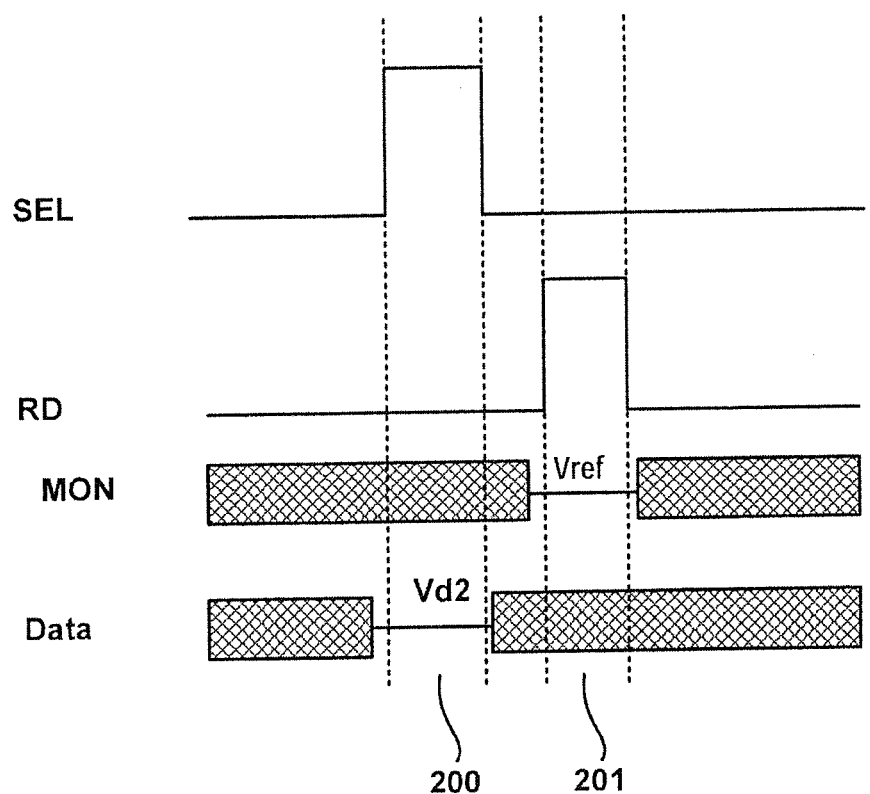
FIG. 2C is a timing diagram of second exemplary operation cycles for the pixel shown in FIG. 2A.

FIG. 2C is a modified schematic timing diagram of another set of exemplary operation cycles for the pixel 110 shown in FIG. 2A, for taking only a single reading of the drive current and comparing that value with a known reference value. For example, the reference value can be the desired value of the drive current derived by the controller to compensate for degradation of the drive transistor 112 as it ages. The OLED voltage $V_{OLED}$ can be extracted by measuring the difference between the pixel currents when the pixel is programmed with fixed voltages in both methods (being affected by $V_{OLED}$ and not being affected by $V_{OLED}$). This difference and the current-voltage characteristics of the pixel can then be used to extract $V_{OLED}$.

During the first cycle 200 of the exemplary timing diagram in FIG. 2C, the select line SEL is high to turn on the switching transistor 118, and the read line RD is low to turn off the read transistor 118. The data line Vdata supplies a voltage Vd2 to node A via the switching transistor 118. During the second cycle 201, SEL is low to turn off the switching transistor 118, and RD is high to turn on the read transistor 119. The monitor line MON supplies a voltage Vref to the node B via the read transistor 118, while a reading of the value of the drive current is taken via the read transistor 119 and the monitor line MON. This read value is compared with the known reference value of the drive current and, if the read value and the reference value of the drive current are different, the cycles 200 and 201 are repeated using an adjusted value of the voltage Vd2. This process is repeated until the read value and the reference value of the drive current are substantially the same, and then the adjusted value of Vd2 can be used to determine $V_{OLED}$.

Figure 3:
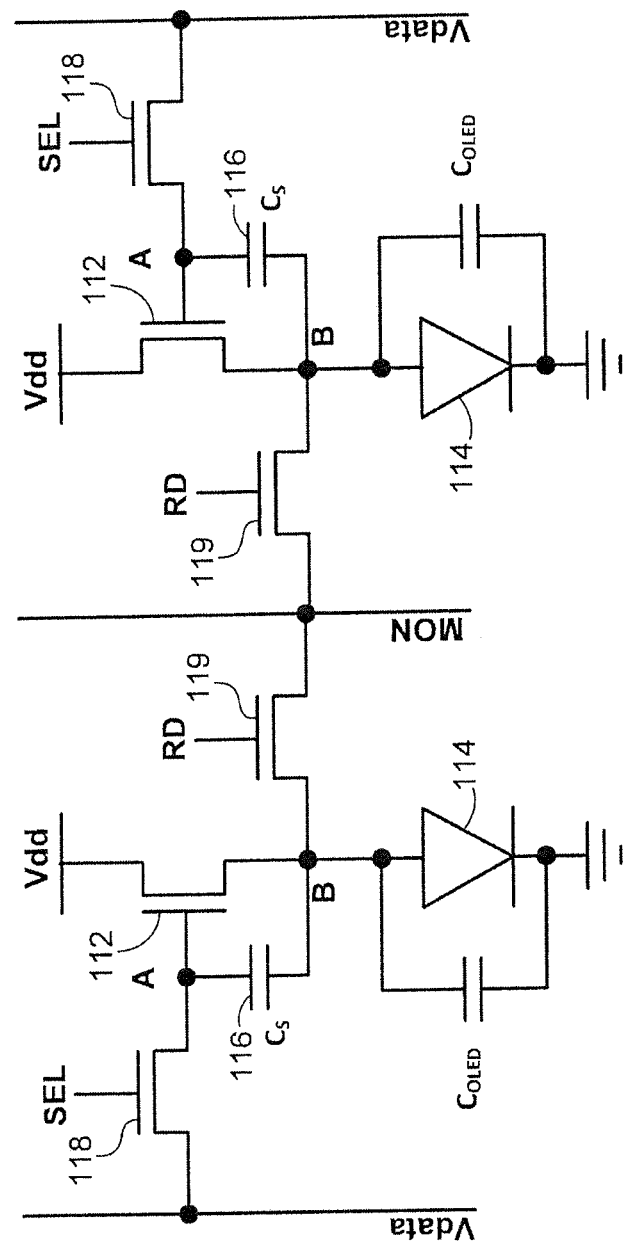
FIG. 3 is a circuit diagram of another exemplary pixel circuit configuration.

FIG. 3 is a circuit diagram of two of the pixels 110a and 110b like those shown in FIG. 2A but modified to share a common monitor line MON, while still permitting independent measurement of the driving current and OLED voltage separately for each pixel. The two pixels 110a and 110b are in the same row but in different columns, and the two columns share the same monitor line MON. Only the pixel selected for measurement is programmed with valid voltages, while the other pixel is programmed to turn off the drive transistor 12 during the measurement cycle. Thus, the drive transistor of one pixel will have no effect on the current measurement in the other pixel.

Figure 4:
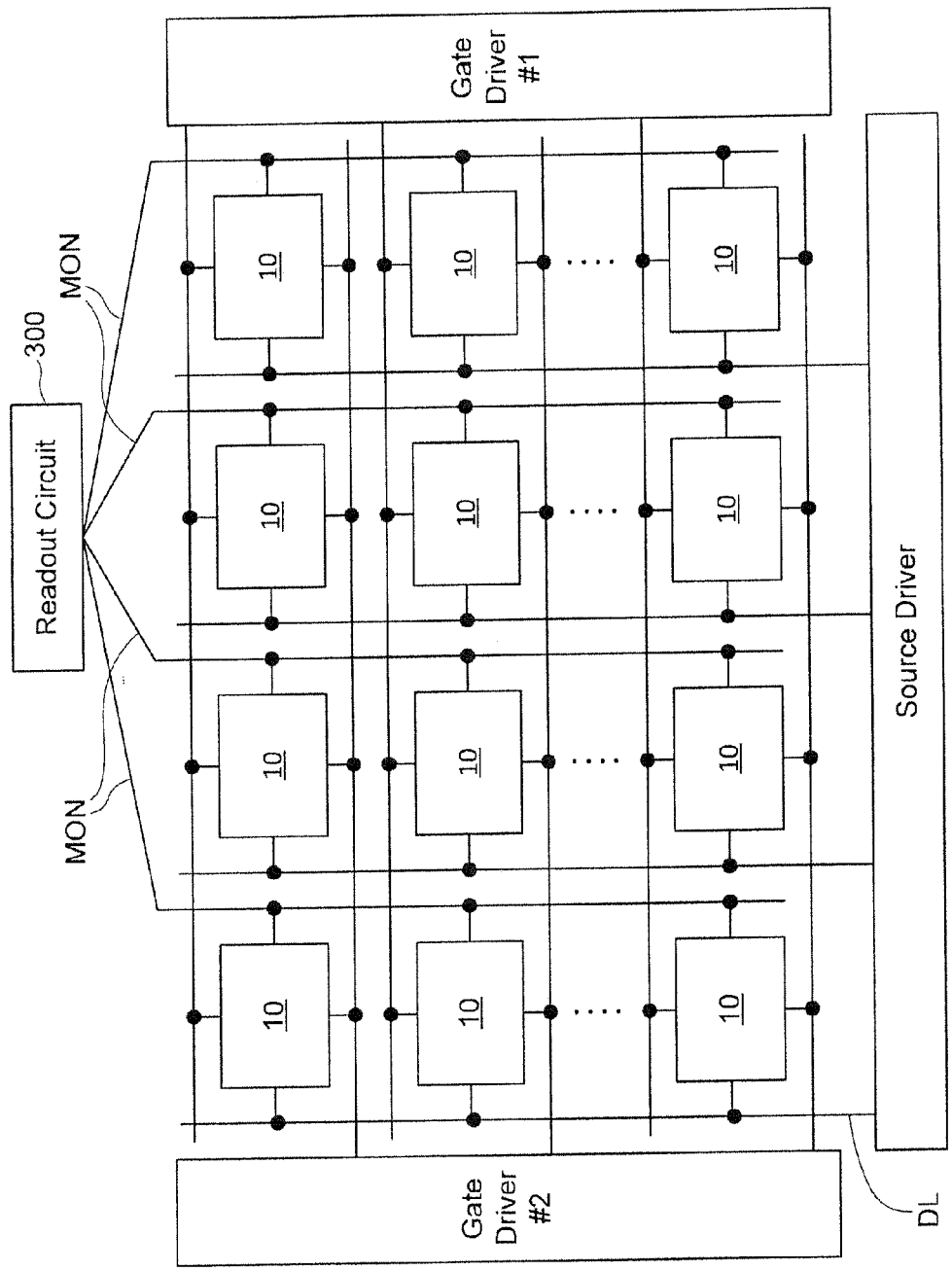
FIG. 4 is a block diagram of a modified configuration of a system for driving an OLED display using a shared readout circuit, while monitoring the degradation of the individual pixels and providing compensation therefor.

FIG. 4 illustrates a modified drive system that utilizes a readout circuit 300 that is shared by multiple columns of pixels while still permitting the measurement of the driving current and OLED voltage independently for each of the individual pixels 10. Although only four columns are illustrated in FIG. 4, it will be understood that a typical display contains a much larger number of columns, and they can all use the same readout circuit. Alternatively, multiple readout circuits can be utilized, with each readout circuit still sharing multiple columns, so that the number of readout circuits is significantly less than the number of columns. Only the pixel selected for measurement at any given time is programmed with valid voltages, while all the other pixels sharing the same gate signals are programmed with voltages that cause the respective drive transistors to be off. Consequently, the drive transistors of the other pixels will have no effect on the current measurement being taken of the selected pixel. Also, when the driving current in the selected pixel is used to measure the OLED voltage, the measurement of the OLED voltage is also independent of the drive transistors of the other pixels.

Figure 5:
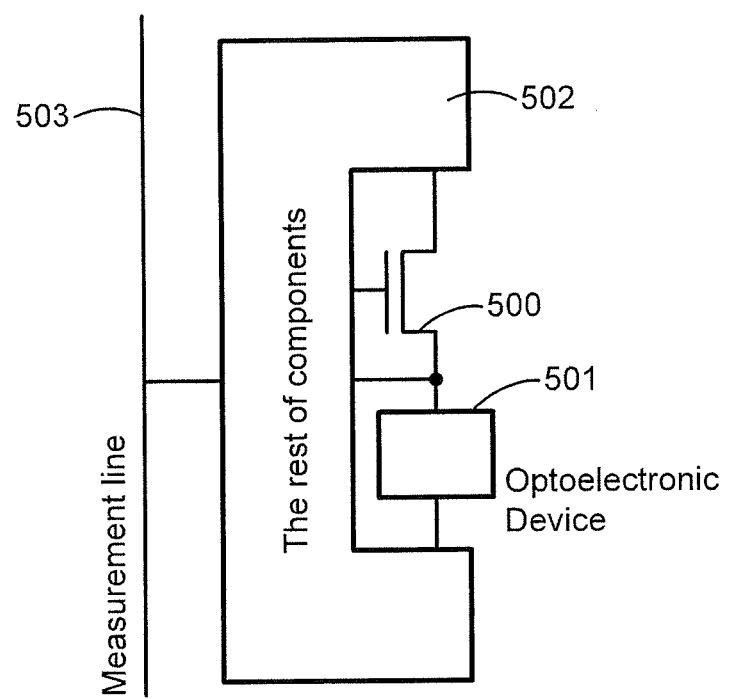
FIG. 5 is a schematic illustration of a pixel circuit having a driving transistor, an optoelectronic device, and a measurement line.

FIG. 5 illustrates one of the pixel circuits in a solid state device that includes an array of pixels. In the illustrative pixel circuit, a drive transistor 500 is connected in series with a load such as an optoelectronic device 501. The rest of the components 502 of the pixel circuit are coupled to a measurement line 503 that allows extraction of the characteristics of the driving part and/or the driven load for further calibration of the performance of the solid-state device. In this example, the optoelectronic device is an OLED, but any other device can be used.

Sharing a measurement (monitor) line with a plurality of columns can reduce the overhead area. However, sharing a monitor line affects the OLED measurements. In most cases, an OLED from one of the adjacent columns using a shared monitor line will interfere with measurement of a selected OLED in the other one of the adjacent columns.

In one aspect of the invention, the OLED characteristics are measured indirectly by measuring the effect of an OLED voltage or current on another pixel element.

In another aspect of the invention, the OLEDs of adjacent pixels with a shared monitor line are forced in a known stage. The selected OLED characteristic is measured in different stages, and the selected OLED characteristic is extracted from the measurement data.

In yet another aspect of the invention, the drive transistor is used to force the OLED samples to a known status. Here, the drive transistor is programmed to a full ON status. In addition, the power supply line can be modified to make the OLED status independent of the drive TFT characteristics. For example, in the case of a pixel circuit with an n-type transistor and the OLED at the source of the drive transistor, the drain voltage of the drive transistor (e.g., the power supply) can be forced to be lower than (or close to) the full ON voltage of the drive TFT. In this case, the drive transistor will act as a switch forcing the OLED voltage to be similar to the drain voltage of the drive TFT.

In a further aspect of the invention, the status of the selected OLED is controlled by the measurement line. Therefore, the measurement line can direct the characteristics of a selected OLED to the measurement circuit with no significant effect from the other OLED connected to the measurement line.

In a still further aspect of the invention, the status of all the OLED samples connected to the shared monitor lines is forced to a known state. The characteristic is measured, and then the selected OLED is set free to be controlled by the measurement line. Then the characteristic of a selected OLED sample is measured. The difference between the two measurements is used to cancel any possible contamination form the unwanted OLED samples.

In yet another aspect of the invention, the voltage of the unwanted OLED samples is forced to be similar to the voltage of the measurement line. Therefore, no current can flow from the OLED lines to the measurement line.

Figure 6:
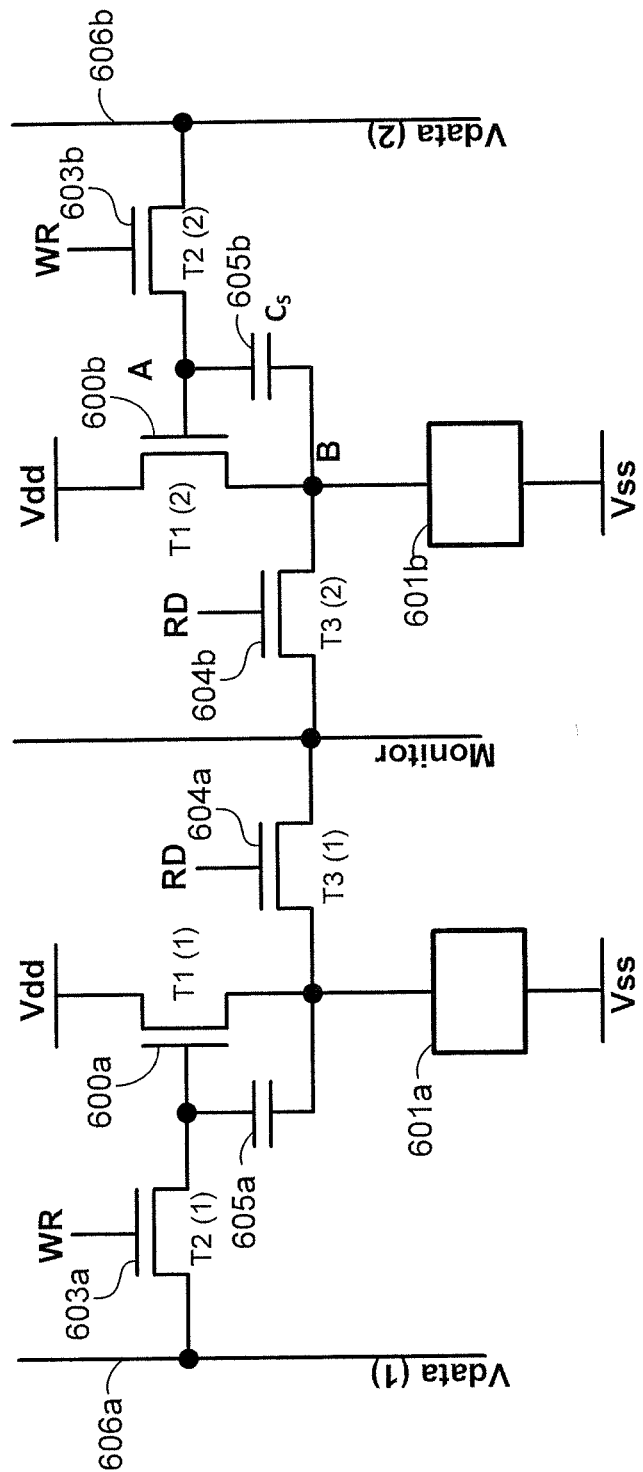
FIG. 6 is a circuit diagram of a pair of pixel circuits having a shared monitor line.

FIG. 6 illustrates a pair of pixel circuits that share a common monitor line 602 for adjacent pixel circuits having respective drive transistors 600a, 600b driving corresponding optoelectronic devices 601a, 601b. The adjacent pixel circuits also have respective write transistors 603a, 603b, read transistors 604a, 604b, storage capacitors 605a, 605b, and data lines 606a, 606b. The methods described above and hereafter can be applied to different pixel circuits, and this is just an example.

During a first phase, the voltage Vdd is set to the voltage of the monitor line, and the drive transistors 600a, 600b are programmed to be in a full ON stage. While the read transistors 604a, 604b are ON, the current through these transistors and the monitor line 602 is measured. This current includes all the leakages to the monitor line and other non-idealities. If the leakage current (and non-idealities) is negligible, this phase can be omitted. Also, the drive voltages Vdd need not be changed if the drive transistors are very strong.

During a second phase, the drive transistor of the selected OLED is set to an OFF stage. Thus, the corresponding optoelectronic device is controlled by the monitor line 602. The current of the monitor line 602 is measured again.

The measurements can highlight the changes in the current of the first optoelectronic device for a fixed voltage on the monitor line. The measurement can be repeated for different OLED voltages to fully characterize the OLED devices.

While the device goes in standby, the display can show some basic information. For example, in some wearable devices (e.g., smart watches or exercise bands) the display shows some content all the time. The main challenge in this case is the power consumption associated with the display. This power includes both static power stemming from the backlight or the emissive device in the pixel and dynamic power associated with refreshing the display.

To reduce the static power, the brightness of the display can be reduced, or only a section of the display can be ON and the rest be OFF (or at lower brightness). This also can help the dynamic power consumption since only a small section of the display needs to be programmed.

FIG. 7 illustrates a display with a segmented power supply Vdd1-VddS for power saving. Here each of five different horizontal segments of the display is supplied with a different voltage so that the voltage of each segment can be controlled separately. Each segment can be assigned to a different voltage or disconnected from any voltage levels. For example, during a standby mode, only the $3^{rd}$ segment may be ON, as depicted in FIG. 7. Therefore only the content for the $3^{rd}$ segment needs to be transferred to the display, and thus both the dynamic and static power consumption will be reduced by 80%. The display can be segmented either vertically or horizontally, or in both directions, with each segment receiving a separate power supply. In one example, the VDD and VSS can be adjusted in the same direction (horizontal or vertical). In another example, VDD and VSS can be adjusted in different directions (one in horizontal and the other one in vertical). It is also possible to segment in other directions, such as diagonal. Here, the power lines can be connected to different voltage levels through switches or can be disconnected from all the voltages.

One case of power adjustment uses a multiplexer to connect different voltage levels to different segments. In another case, the power supply can be adjusted at the pixel level. In this case, the power supply can be adjusted at vertical or horizontal segments or the combination of the two cases. In one example, the VDD and VSS can be adjusted in the same direction (horizontal, vertical or other directions such as diagonal). In another example, VDD and VSS can be adjusted in different directions (e.g., one horizontal and the other vertical, or in other directions such as diagonal).

FIG. 8 is a schematic of an electrical circuit for adjusting the power supply at a segment level. Here, a segment (i) can be connected to either of a pair of different voltages Vdd1 and Vdd2 through a pair of controllable switches EM1(i) and EM2(i), or can be disconnected from both the voltages. One case of power supply modification at the pixel level uses emission switches to connect individual pixels, or groups of pixels, to different power supplies. The emission switches may be controlled with a generic signal for each segment. In this case, the power supply can be adjusted at vertical or horizontal segments or a combination of both. In one example, the VDD and VSS can be adjusted in the same direction (horizontal, vertical, diagonal, etc.). In another example, VDD and VSS can be adjusted in different directions (e.g., one in horizontal, the other one in vertical).

FIGS. 9A and 9B are schematic of electrical circuits for adjusting the power supply at the pixel level. Here, the power lines from Vdd1 and Vdd2 or Vss1 and Vss2 can be connected to different pixels through respective controllable switches EM1 and EM2, or any pixel can be disconnected from the voltages all together.

Figure 10:
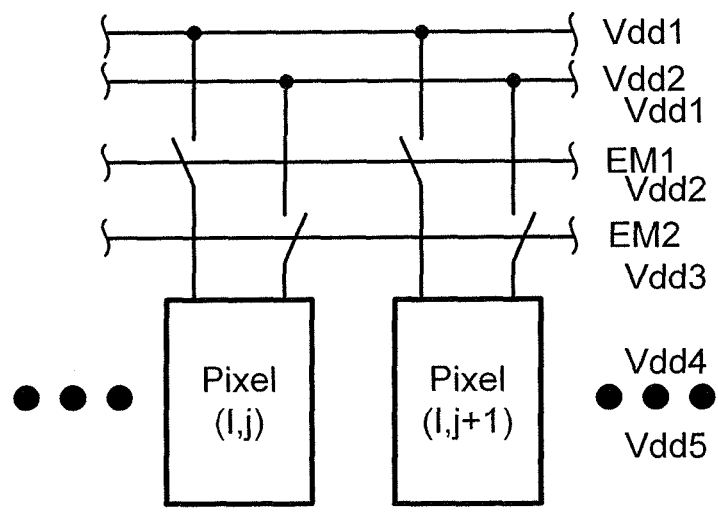
FIG. 10 is a schematic diagram of a pixel arrangement for adjusting the power supply at the pixel level.
Figure 11:
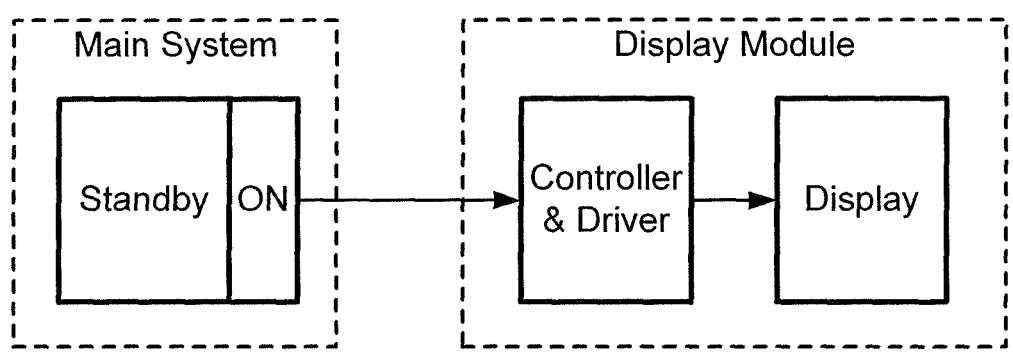
FIG. 11 is a block diagram of a system in standby mode with a display showing active content.

FIG. 10 is a schematic diagram of a pixel arrangement for adjusting the power supply at the pixel level. For dynamic power consumption, one can reduce the refresh rate (frame rate) of the display. However, if the content of the display is changing over time (for example, a watch face) this content needs to be produced and transferred to the display. As a result, part of the main system will be on and there will be power consumption associated with transferring data from the main system to the display. FIG. 11 illustrates a system in standby mode with a display showing active content.

To eliminate the extra power consumption associated with transferring data between the main system and the display during the standby mode, some basic functionality can be added to the display driver to produce recursive changes in the content. For example, the driver can have multiple frame buffers, which are pre-populated by the main system in advance (e.g., before going to the standby mode, or during boot-up or power-up) and depending on different conditions, one of the frame buffers may be used to program the display. For example, a timer can be used to flip between the frame buffers (see FIG. 9). The main issue in this case is that for some applications, such as a watch face, there are many different combinations that will require significantly large memory to store them as full frame buffers.

Figure 12:
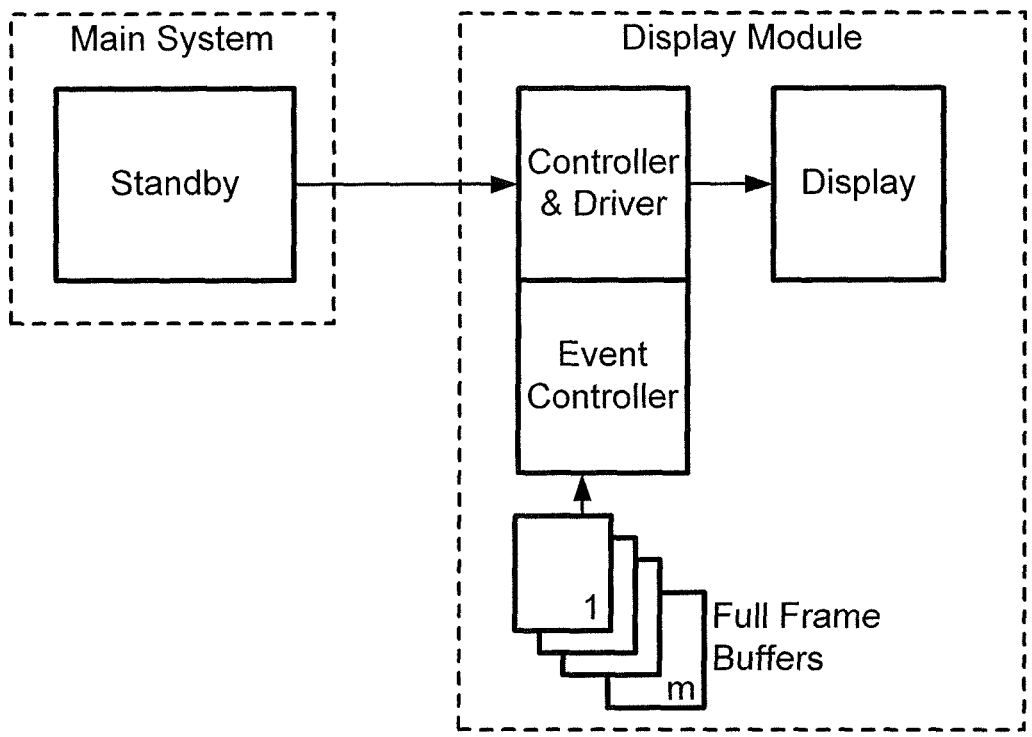
FIG. 12 is a block diagram of a display module with multiple frame buffers for supporting active content during standby.
Figure 13:
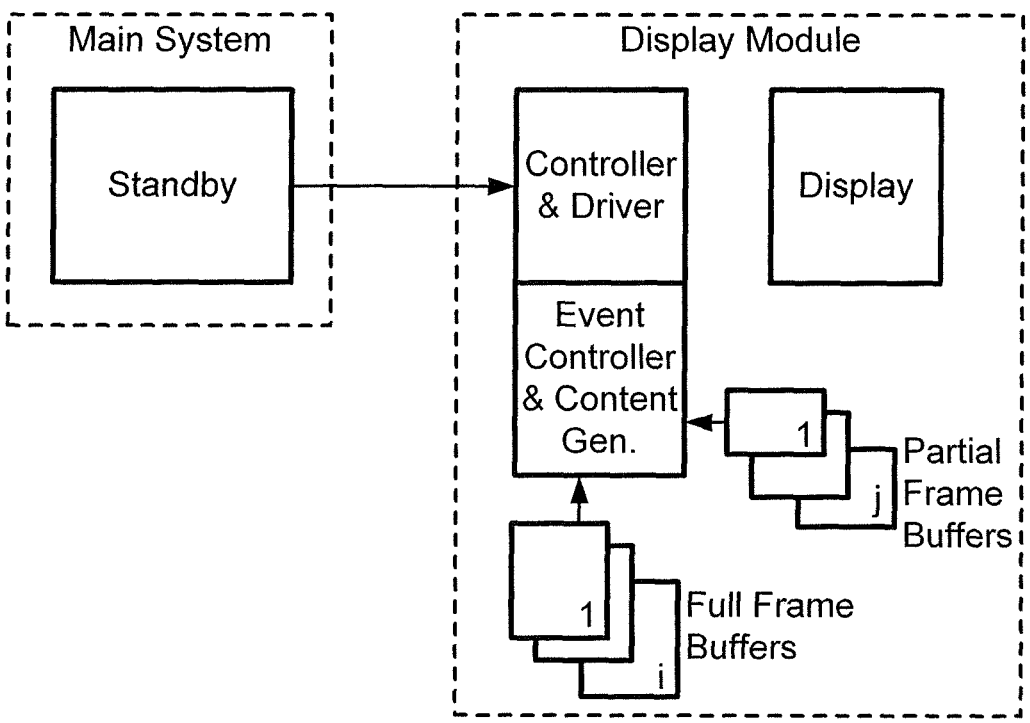
FIG. 13 is a block diagram of a display module with frame buffers and content generation module for supporting active content during standby.

FIG. 12 illustrates a display module with multiple frame buffers for supporting active content during standby. The driver can have a plurality of full frame buffers, and the other partial frame buffers only store the changes applied to one of the full frame buffers based on certain conditions. For example, the hand positions in a watch face can be stored as the changes to the watch face in partial frame buffers, while the watch face itself is stored in the full frame buffer. An exemplary block diagram of a display with a full frame buffer and a partial frame buffer is illustrated in FIG. 13, which shows a display module with frame buffers and a content generation module for supporting active content during standby. Here, the content generator module selects a full frame buffer and a partial frame buffer based on some conditions, and it modifies the image stored in the full frame buffer based on the information in the partial frame buffer. Also, one can use the multiple full and partial frame buffers to create a new content.

Alternatively, the driver can perform some basic calculation such as moving an object by a trajectory. In this case, for different conditions, some part of the image in the full frame buffers is moved based on a trajectory, or the object stored in the partial frame buffer is moved and the main frame buffer is modified by the new calculated object.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A system for driving a display, the system comprising:
a plurality of pixel circuits arranged in an array, each of said pixel circuits comprising a light emitting device and a driving transistor for conveying a driving current through the light emitting device, said array being divided into multiple segments adapted to receive different static supply voltages for a duration exceeding a refresh period of the display;
a first plurality of supply lines each associated with at least one pixel circuit in a preselected segment of said array, the first plurality of supply lines providing driving currents to the at least one pixel circuit in said preselected segment
a plurality of voltage supplies configured to simultaneously provide different static supply voltages greater than zero to different segments of said array enabling light emitting devices of pixels circuits from each of said different segments powered by each of said different static supply voltages to simultaneously emit light, said voltage supplies being controllably coupled to the pixel circuits in said preselected segment of said array for the duration exceeding the refresh period of the display; and
a controller for determining which of said plurality of voltage supplies, if any, is connected to each of said multiple segments of said array for the duration exceeding the refresh period of the display.

2. The system of claim 1 which includes controllable switches coupling said plurality of voltage supplies to the at least one pixel circuit in each of said multiple segments of said array for the duration exceeding the refresh period of the display.

* * * * *